US012499490B2

(12) United States Patent
Homma

(10) Patent No.: US 12,499,490 B2
(45) Date of Patent: Dec. 16, 2025

(54) INFORMATION PROCESSING DEVICE, INFORMATION PROCESSING METHOD, SERVER DEVICE, VEHICLE DEVICE, AND INFORMATION PROCESSING PROGRAM

(71) Applicant: Sony Group Corporation, Tokyo (JP)

(72) Inventor: Fuminori Homma, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 9 days.

(21) Appl. No.: 18/294,175

(22) PCT Filed: Mar. 28, 2022

(86) PCT No.: PCT/JP2022/014819
§ 371 (c)(1),
(2) Date: Feb. 1, 2024

(87) PCT Pub. No.: WO2023/017652
PCT Pub. Date: Feb. 16, 2023

(65) Prior Publication Data
US 2024/0338770 A1  Oct. 10, 2024

(30) Foreign Application Priority Data

Aug. 11, 2021  (JP) .................... 2021-131083

(51) Int. Cl.
*G06Q 40/08* (2012.01)
*G06T 13/00* (2011.01)
*G06V 10/774* (2022.01)
*H04N 7/18* (2006.01)

(52) U.S. Cl.
CPC ............. *G06Q 40/08* (2013.01); *G06T 13/00* (2013.01); *G06V 10/774* (2022.01); *H04N 7/183* (2013.01)

(58) Field of Classification Search
CPC ............................ G06Q 40/08; H04N 7/183
See application file for complete search history.

(56) References Cited

U.S. PATENT DOCUMENTS

| 10,796,578 | B1 * | 10/2020 | Jackson | G08G 1/205 |
| 11,162,800 | B1 * | 11/2021 | Carbery | G01C 21/28 |
| 2016/0163217 | A1 * | 6/2016 | Harkness | G09B 7/00 434/65 |

(Continued)

FOREIGN PATENT DOCUMENTS

| CN | 107909113 A | 2/2018 |
| CN | 110942623 A | 3/2020 |

(Continued)

*Primary Examiner* — Scott C Anderson
(74) *Attorney, Agent, or Firm* — Paratus Law Group, PLLC

(57) ABSTRACT

An information processing device (100) includes an acquisition unit (131) that acquires a fault percentage rule defined according to a situation at a time of occurrence of an accident and indicating a percentage of fault of a party of the accident, a moving image generation unit (132) that generates a simulated moving image assuming the situation at the time of occurrence of the accident which situation corresponds to the fault percentage rule, and a learning data generation unit (133) that generates learning data in which a learning moving image in which a component included in the simulated moving image is changed as a parameter is associated with the percentage of fault.

10 Claims, 17 Drawing Sheets

(56) References Cited

U.S. PATENT DOCUMENTS

| | | | |
|---|---|---|---|
| 2019/0205667 A1 | 7/2019 | Avidan et al. | |
| 2021/0097408 A1* | 4/2021 | Sicconi | G06N 20/00 |
| 2021/0201415 A1* | 7/2021 | Mendenhall | G06Q 40/08 |

FOREIGN PATENT DOCUMENTS

| | | |
|---|---|---|
| JP | 2001-347970 A | 12/2001 |
| JP | 2007-264820 A | 10/2007 |
| JP | 2016-081087 A | 5/2016 |
| JP | 2018-163554 A | 10/2018 |
| JP | 2020-194263 A | 12/2020 |
| JP | 2020-194528 A | 12/2020 |
| KR | 10-2016-0112817 A | 9/2016 |
| WO | WO 2020/079916 A1 | 4/2020 |
| WO | WO 2021/118047 A1 | 6/2021 |

* cited by examiner

| OBJECT ID | ATTRIBUTE | TYPE | ... |
|---|---|---|---|
| ... | ... | ... | ... |
| E01 | VEHICLE | SEDAN | ... |
| E02 | VEHICLE | LIGHT CAR | ... |
| E03 | VEHICLE | MINIVAN | ... |
| E04 | VEHICLE | TRUCK | ... |
| E05 | VEHICLE | SUV | ... |
| E06 | VEHICLE | EMERGENCY VEHICLE | ... |
| E07 | VEHICLE | LARGE MOTORCYCLE | ... |
| E08 | LIGHT VEHICLE | BICYCLE | ... |
| E09 | PERSON | PEDESTRIAN(ADULT) | ... |
| E10 | PERSON | PEDESTRIAN(CHILD) | ... |
| ... | ... | ... | ... |

| OBJECT ID | ATTRIBUTE | TYPE | ... |
|---|---|---|---|
| ... | ... | ... | ... |
| E21 | SUBSTANCE | TRAFFIC LIGHT(RED) | ... |
| E22 | SUBSTANCE | TRAFFIC LIGHT(YELLOW) | ... |
| E23 | SUBSTANCE | TRAFFIC LIGHT(GREEN) | ... |
| E24 | SUBSTANCE | SIGN(ONE WAY) | ... |
| E25 | SUBSTANCE | SIGN(STOP) | ... |
| ... | ... | ... | ... |

FIG.12

| OBJECT ID | ATTRIBUTE | TYPE | ... |
|---|---|---|---|
| ... | ... | ... | ... |
| E31 | ROAD | PARKING LOT(SINGLE ROW) | ... |
| E32 | ROAD | PARKING LOT(TWO ROW) | ... |
| E33 | ROAD | PARKING LOT(INTERSECTION) | ... |
| E34 | ROAD | INTERSECTION (WITH TRAFFIC LIGHT/WITH CROSSWALK) | ... |
| E35 | ROAD | INTERSECTION (WITH TRAFFIC LIGHT/WITHOUT CROSSWALK) | ... |
| E36 | ROAD | INTERSECTION(WITHOUT TRAFFIC LIGHT/EVEN) | ... |
| E37 | ROAD | INTERSECTION (WITHOUT TRAFFIC LIGHT/WIDE AND NARROW) | ... |
| E38 | ROAD | INTERSECTION (WITHOUT TRAFFIC LIGHT/WITH STOP SIGN) | ... |
| E39 | ROAD | INTERSECTION (WITHOUT TRAFFIC LIGHT/WITH NO-ENTRY SIGN) | ... |
| E40 | ROAD | INTERSECTION (WITHOUT TRAFFIC LIGHT/WITH PRIORITY ROAD) | ... |
| E41 | ROAD | STRAIGHT ROAD (WITH CENTER LINE/ONE TRAFFIC LANE) | ... |
| E42 | ROAD | STRAIGHT ROAD (WITH CENTER LINE/TWO TRAFFIC LANE) | ... |
| E43 | ROAD | STRAIGHT ROAD (WITH CENTER LINE/THREE TRAFFIC LANE) | ... |
| E44 | ROAD | STRAIGHT ROAD (WITH CENTER LINE/THREE TRAFFIC LANE/ ZEBRA ZONE) | ... |
| E45 | ROAD | EXPRESS WAY(ONE TRAFFIC LANE) | ... |
| E46 | ROAD | EXPRESS WAY(TWO TRAFFIC LANE) | ... |
| E47 | ROAD | EXPRESS WAY(THREE TRAFFIC LANE) | ... |
| E48 | ROAD | EXPRESS WAY (WITH ACCELERATING VEHICLE/TWO TRAFFIC LANE) | ... |
| E49 | ROAD | EXPRESS WAY (WITH ACCELERATING VEHICLE/ THREE TRAFFIC LANE) | ... |
| ... | ... | ... | ... |

| ANIMATION ID | ATTRIBUTE | TYPE | ... |
|---|---|---|---|
| ... | ... | ... | ... |
| F01 | VEHICLE | GO STRAIGHT | ... |
| F02 | VEHICLE | TURN LIGHT | ... |
| F03 | VEHICLE | TURN LEFT | ... |
| F04 | VEHICLE | RIGHT U-TURN | ... |
| F05 | VEHICLE | STOPPED | ... |
| F06 | VEHICLE | RIGHT BACKWARD PARKING | ... |
| F07 | VEHICLE | LEFT BACKWARD PARKING | ... |
| F08 | VEHICLE | SUDDEN BRAKING | ... |
| ... | ... | ... | ... |

| SPEED PARAMETER ID | ATTRIBUTE | SPEED/ACCELERATION DATA | ... |
|---|---|---|---|
| ... | ... | ... | ... |
| G01 | VEHICLE | H01 | ... |
| G02 | VEHICLE | H02 | ... |
| G03 | VEHICLE | H03 | ... |
| ... | ... | ... | ... |
| G11 | PEDESTRIAN | H11 | ... |
| G12 | PEDESTRIAN | H12 | ... |
| ... | ... | ... | ... |
| G21 | BICYCLE | H21 | ... |
| ... | ... | ... | ... |

INFORMATION PROCESSING DEVICE, INFORMATION PROCESSING METHOD, SERVER DEVICE, VEHICLE DEVICE, AND INFORMATION PROCESSING PROGRAM

CROSS REFERENCE TO PRIOR APPLICATION

This application is a National Stage Patent Application of PCT International Patent Application No. PCT/JP2022/014819 (filed on Mar. 28, 2022) under 35 U.S.C. § 371, which claims priority to Japanese Patent Application No. 2021-131083 (filed on Aug. 11, 2021), which are all hereby incorporated by reference in their entirety.

FIELD

The present disclosure relates to an information processing device, an information processing method, a server device, a vehicle device, and an information processing program that generate data used for learning of a model of determining similarity of videos.

BACKGROUND

For calculation of insurance, when a traffic accident occurs, an insurance company determines a percentage of fault of parties on the basis of a situation of the occurrence of the accident. In recent years, the percentage of fault may be determined with reference to a video of a drive recorder mounted on a vehicle.

With respect to such determination of the percentage of fault, a technique of quickly deriving the percentage of fault by comparing an analysis result of video data acquired from an accident vehicle with past accident case data has been known.

CITATION LIST

Patent Literature

Patent Literature 1: Japanese Patent Application Laid-open No. 2020-194263

SUMMARY

Technical Problem

However, in order to collate video data acquired from an accident vehicle with past cases, a work load is heavy. That is, there are various accident occurrence situations, and it is difficult to cover various accident cases and create a database. In addition, since it is necessary to manually rule situations of the accident cases and create the database, it takes much time and effort including maintenance of updating the database.

In this regard, a method of creating a model acquired by learning of features of the video data in which the accident occurrence situation is recorded, and of collating the video data acquired from the accident vehicle with the past cases by using the created model can also be employed. However, the number of pieces of video data in which the accident occurrence cases are recorded is limited, and it is difficult to acquire a sufficient amount of video data required for learning.

Thus, the present disclosure proposes an information processing device, an information processing method, a server device, a vehicle device, and an information processing program capable of efficiently generating video data used for learning.

Solution to Problem

In order to solve the above problems, an information processing device according to an embodiment of the present disclosure includes an acquisition unit that acquires a fault percentage rule defined according to a situation at a time of occurrence of an accident and indicating a percentage of fault of a party of the accident, a moving image generation unit that generates a simulated moving image assuming the situation at the time of occurrence of the accident which situation corresponds to the fault percentage rule, and a learning data generation unit that generates learning data in which a learning moving image in which a component included in the simulated moving image is changed as a parameter is associated with the percentage of fault.

BRIEF DESCRIPTION OF DRAWINGS

FIG. 10 is a view (1) illustrating an example of a parameter storage unit according to the embodiment.

FIG. 11 is a view (2) illustrating an example of the parameter storage unit according to the embodiment.

FIG. 12 is a view (3) illustrating an example of the parameter storage unit according to the embodiment.

FIG. 13 is a view (4) illustrating an example of the parameter storage unit according to the embodiment.

FIG. 14 is a view (5) illustrating an example of the parameter storage unit according to the embodiment.

DESCRIPTION OF EMBODIMENTS

In the following, embodiments will be described in detail on the basis of the drawings. Note that in each of the following embodiments, overlapped description is omitted by assignment of the same reference sign to the same parts.

The present disclosure will be described in the following order of items.

1. Embodiment
   1-1. Outline of information processing according to the embodiment
   1-2. Configuration of an information processing device according to the embodiment
   1-3. Configuration of an insurance company server according to the embodiment
   1-4. Configuration of a vehicle according to the embodiment
   1-5. Procedure of processing according to the embodiment
2. Other embodiments
3. Effects of an information processing device according to the present disclosure
4. Hardware configuration 1. Embodiment (1-1. Outline of Information Processing According to the Embodiment)

Figure 1:
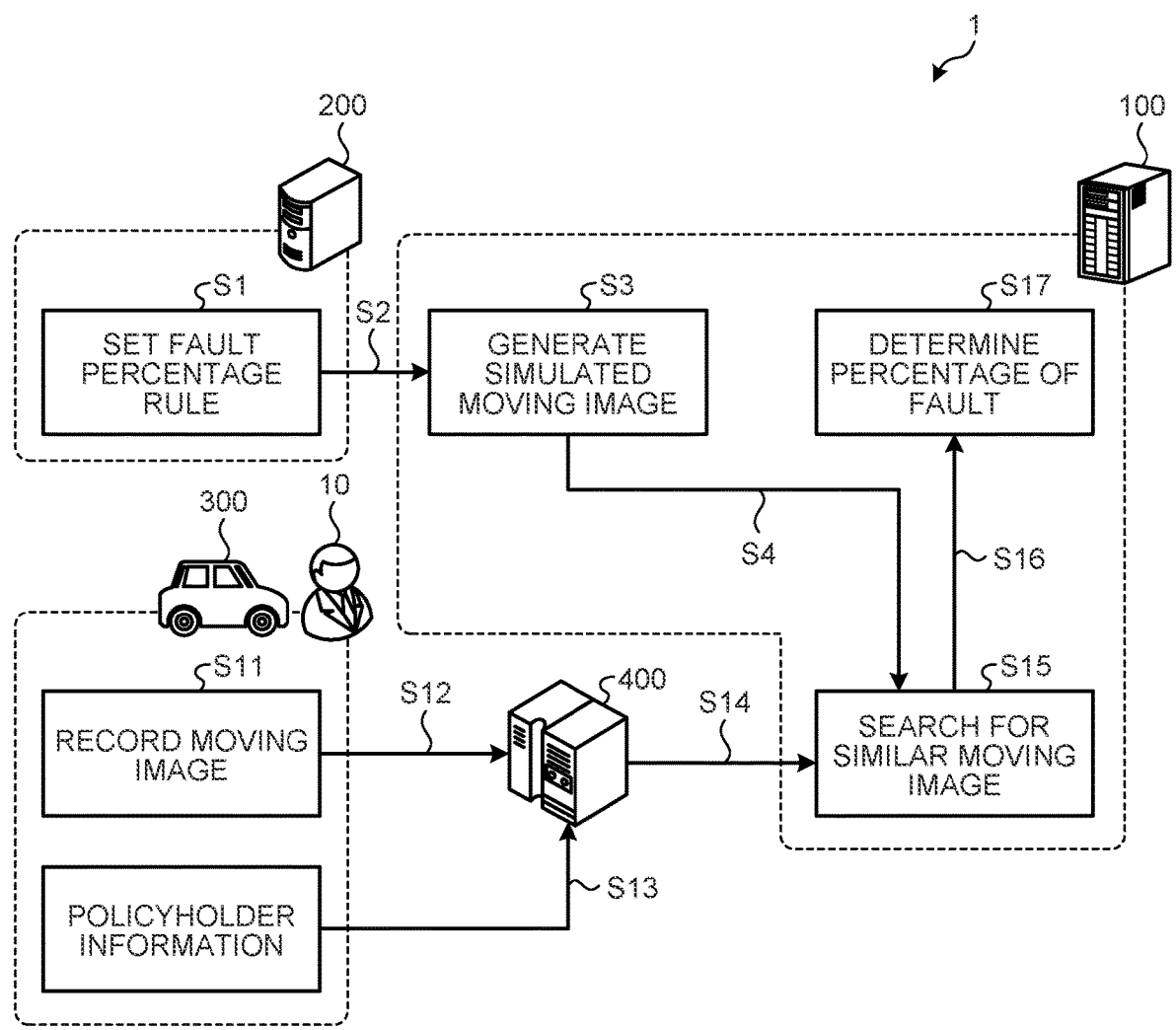
FIG. 1 is a view illustrating an outline of information processing according to an embodiment.

An example of information processing according to the embodiment of the present disclosure will be described with reference to FIG. 1. FIG. 1 is a view illustrating an outline of the information processing according to the embodiment. Specifically, FIG. 1 is a block diagram schematically illustrating components of an information processing system 1 that executes information processing according to the embodiment and a flow of the information processing executed by the information processing system 1.

As illustrated in FIG. 1, the information processing system 1 includes an information processing device 100, an insurance company server 200, a vehicle 300, and a moving image management server 400.

The information processing device 100 is an example of an information processing device that executes information processing according to the present disclosure, and is, for example, a server. The insurance company server 200 is a server managed by an insurance company that operates insurance relating to traffic accidents and the like. The vehicle 300 is an automobile used by a user 10. The moving image management server 400 is a server that manages a moving image recorded in a drive recorder mounted on the vehicle 300.

Note that each device in FIG. 1 conceptually illustrates a function in the information processing system 1, and can have various modes depending on the embodiment. For example, the information processing device 100 may include two or more servers different for each function (described later). Furthermore, the information processing device 100 and the insurance company server 200 may also function as the moving image management server 400. Furthermore, instead of recording or transmitting the moving image by itself, the vehicle 300 may record or transmit the moving image in cooperation with a terminal (such as a smartphone) owned by the user 10.

In the example illustrated in FIG. 1, the information processing device 100 performs processing of determining a percentage of fault of parties on the basis of a fault percentage rule between the parties of accident which rule is set by the insurance company server 200. For example, in a case where the user 10 who has a contract for insurance is involved in an accident, the information processing device 100 determines the percentage of fault of the user 10 on the basis of the drive recorder moving image recording a situation of the accident. Note that the fault percentage rule is a rule defined by an insurance company that provides insurance related to an accident, and is a rule applied when a percentage of fault between parties of an accident is determined. Specifically, the fault percentage rule is a rule defined to calculate the percentage of fault of both parties on the basis of various kinds of information such as a situation at the time of occurrence of the accident, past precedent, and actions of the parties that cause the accident. Note that the fault percentage rule does not necessarily need to be defined by the insurance company, and may be defined, for example, on the basis of a standard table or the like created by a court, an attorney, or the like of the country in order to determine a percentage of fault according to an accident form on the basis of past precedent or the like.

In automation of the determination of the percentage of fault, a method of creating a model in which features of video data recording an accident occurrence situation are learned, and collating video data, which is acquired from an accident vehicle, with a past case by using the created model can be employed. However, the number of pieces of video data in which the accident occurrence cases are recorded is limited, and it is difficult to acquire a sufficient amount of video data required for learning.

Thus, the information processing device 100 according to the embodiment makes it possible to acquire a sufficient amount of video data required for learning by a method described below. As a result, since the information processing device 100 can create a highly accurate moving image determination model, in a case where a video of an actual accident is acquired, it is possible to appropriately determine the percentage of fault of the accident on the basis of the video. In the following, an outline of information processing according to the present disclosure will be described along a flow with reference to FIG. 1.

As illustrated in FIG. 1, the insurance company server 200 sets a rule for determining a percentage of fault between parties in an accident (Step S1). Specifically, in a case where a vehicle traveling on a relatively wide road collides with a bicycle traveling on a relatively narrow road, the insurance company server 200 sets a rule in which a situation at the time of occurrence of the accident and a numerical value indicating the percentage of fault are associated with each other, the percentage of fault of the both being set to "90:10", for example. The fault percentage rule is set on the basis of past knowledge of the insurance company, a history of accident results, a law such as the Road Traffic Act of the country, and the like.

The insurance company server 200 transmits the set fault percentage rule to the information processing device 100 (Step S2). When acquiring the fault percentage rule, the information processing device 100 generates a simulated moving image, in which a situation of the accident is imitated, with reference to the situation indicated in the fault percentage rule (Step S3).

For example, the information processing device 100 generates a simulated moving image indicating a situation "a vehicle traveling on a relatively wide road collides with a bicycle traveling on a relatively narrow road", which is the situation indicated in the fault percentage rule. Specifically, the information processing device 100 generates, as the simulated moving image, an animation moving image in which the "relatively wide road", the "traveling vehicle", the "relatively narrow road", and the "traveling bicycle" are 3D objects.

Furthermore, the information processing device 100 generates a learning moving image including various variations by handling components such as the 3D objects included in the simulated moving image as parameters. Although details will be described later, the information processing device 100 generates a wide variety of learning moving images by adding changes to the simulated moving image by variously changing types of the vehicle in the 3D objects, changing a traveling speed of the bicycle, or adding an obstacle (such as a sign) to the road. Alternatively, the information processing device 100 may generate the learning moving image by changing a viewpoint or a distance (angle of view) of a camera of when the simulated moving image is reproduced. As a result, the information processing device 100 generates a large quantity of learning moving images that are moving images in which the percentage of fault is set and that include various videos.

Subsequently, the information processing device 100 learns features of the generated learning moving images and generates a learning model for determining similarity of the moving images. For example, in a case where a certain moving image is input, the information processing device 100 generates a model that outputs a moving image vector corresponding to the moving image on the basis of a feature of the moving image. The information processing device 100 can specify a learning moving image similar to the input moving image by determining the similarity between a moving image vector of the input moving image and moving image vectors of the learning moving images generated in advance. As described above, the percentage of fault is associated with each of the learning moving images. Thus, the information processing device 100 can determine that the percentage of fault associated with the similar learning moving image is the percentage of fault in the input moving image by specifying the learning moving image similar to the input moving image.

After generating the model, the information processing device 100 holds, in the storage unit, the generated model and information related to the learning moving image converted into a moving image vector (Step S4). Steps up to Step S4 are a learning phase in the information processing according to the embodiment.

Next, a flow of processing in which the information processing device 100 determines the percentage of fault on the basis of a moving image of an actual accident will be described.

The vehicle 300 keeps recording the moving image during traveling by using the drive recorder while the user 10 keeps driving (Step S11). Then, the vehicle 300 uploads the recorded drive recorder moving image to the moving image management server 400 at a predetermined opportunity (Step S12). For example, in a case where an impact equal to or greater than a predetermined threshold is detected in a vehicle body, the vehicle 300 automatically uploads the drive recorder moving image recording a situation before and after the detection of the impact to the moving image management server 400. Alternatively, the vehicle 300 uploads the drive recorder moving image to the moving image management server 400 in response to operation performed by the user 10 who is in the accident.

At this time, the vehicle 300 also uploads policyholder information related to the user 10 to the moving image management server 400 together with the drive recorder moving image (Step S13). For example, the vehicle 300 uploads an ID or the like for identifying the user 10 as a contractor to the moving image management server 400.

The moving image management server 400 stores the acquired drive recorder moving image and the policyholder information of the user 10 in association with each other. At this time, the moving image management server 400 assigns identification information such as an ID to the drive recorder moving image. The moving image management server 400 transmits the drive recorder moving image to which the ID is assigned to the information processing device 100 (Step S14).

When acquiring the drive recorder moving image, the information processing device 100 performs processing of determining which learning moving image is similar to the drive recorder moving image. For example, the information processing device 100 inputs the drive recorder moving image to a model, and outputs a moving image vector corresponding to the drive recorder moving image. Then, the information processing device 100 searches for a similar moving image that is similar to the drive recorder moving image by determining the similarity between the output moving image vector and the moving image vectors of the learning moving images held in large quantities (Step S15).

The information processing device 100 searches for a similar moving image and specifies which moving image is the similar moving image (Step S16). Then, the information processing device 100 refers to the percentage of fault associated with the specified similar moving image and acquires information related to the percentage of fault between parties in the similar moving image. Then, the information processing device 100 determines the percentage of fault between parties in the accident recorded in the drive recorder moving image on the basis of the percentage of fault associated with the similar moving image (Step S17).

As described above, the information processing device 100 acquires the fault percentage rule indicating the percentage of fault of the parties in the accident which rule is determined according to the situation at the time of occurrence of the accident, and generates the simulated moving image assuming the situation at the time of occurrence of the accident which situation corresponds to the fault percentage rule. Furthermore, the information processing device 100 generates learning data in which a learning moving image in which a component (such as the 3D object) included in the simulated moving image is changed as a parameter is combined with the fault percentage rule. That is, the information processing device 100 can generate a large quantity of learning moving images, in which parameters are changed, on the basis of the simulated moving image indicating a situation of a certain accident. As a result, the information processing device 100 can accurately learn the model for determining the percentage of fault in the accident. In addition, the information processing device 100 can quickly and accurately determine the percentage of fault in the actual accident by determining the similarity between the drive recorder moving image and the learning moving image by using the learned model and the drive recorder moving image recording the actual accident.

Next, the information processing the outline of which is illustrated in FIG. 1 will be described in detail with reference to FIG. 2 to FIG. 7.

Figure 2:
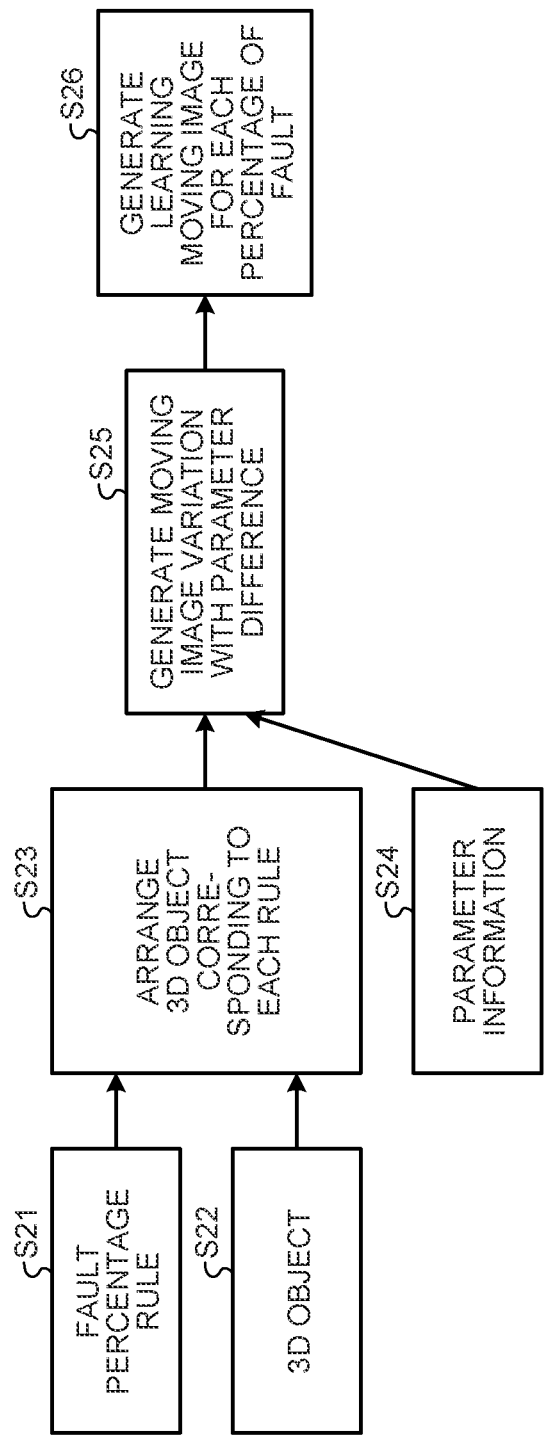
FIG. 2 is a view (1) for describing the information processing according to the embodiment.

FIG. 2 is a view (1) for describing the information processing according to the embodiment. FIG. 2 is a schematic block diagram illustrating processing until the information processing device 100 generates a learning moving image.

The insurance company server 200 sets the fault percentage rule (Step S21). The information processing device 100 sets a 3D object to indicate a situation, which is indicated in the fault percentage rule, by a moving image (Step S22).

The information processing device 100 acquires the fault percentage rule from the insurance company server 200, and arranges the 3D object corresponding to each rule (Step S23). Furthermore, the information processing device 100 sets various kinds of parameter information such as a 3D object and a viewpoint position in the moving image (Step S24).

Then, the information processing device 100 generates moving image variations with parameter differences (Step S25). For example, the information processing device 100 generates moving images of various variations from one situation by changing all components of the moving image, such as different vehicle types and vehicle body sizes, vehicle speeds and acceleration, viewpoints in a moving image animation, road widths, presence or absence of an obstacle on a road, and the like as parameters. As a result, the information processing device 100 can generate a large quantity of learning moving images for each percentage of fault (Step S26).

Figure 3:
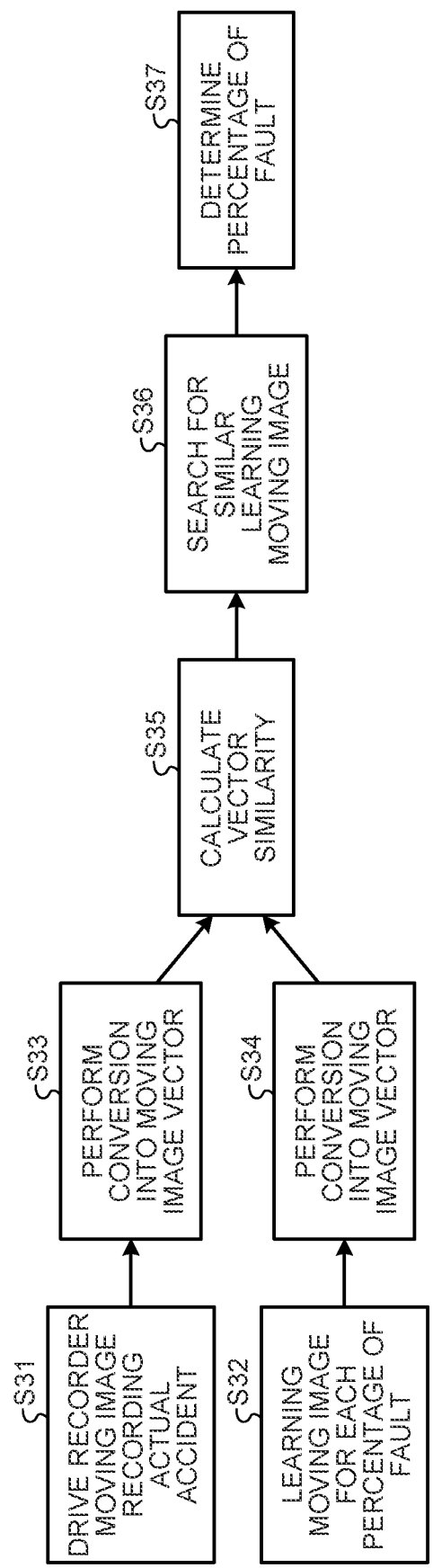
FIG. 3 is a view (2) for describing the information processing according to the embodiment.

Next, a flow of processing of determining the percentage of fault will be described with reference to FIG. 3. FIG. 3 is a view (2) for describing the information processing according to the embodiment. FIG. 3 is a schematic block diagram illustrating the determination processing executed by the information processing device 100.

First, the information processing device 100 acquires the drive recorder moving image recording the actual accident from the moving image management server 400 or the vehicle 300 (Step S31). Furthermore, the information processing device 100 acquires data of the learning moving image for each percentage of fault which moving image is generated in Step S26 (Step S32).

The information processing device 100 converts the drive recorder moving image into a moving image vector (Step S33). Furthermore, the information processing device 100 converts the learning moving image into a moving image vector (Step S34). Note that the information processing device 100 may convert the learning moving image into the moving image vector in advance and store the moving image vector in the storage unit.

Then, the information processing device 100 compares the moving image vector of the drive recorder moving image with the moving image vector of the learning moving image, and calculates the similarity (Step S35). The information processing device 100 searches for a learning moving image similar to the drive recorder moving image on the basis of the calculated similarity (Step S36). The information processing device 100 refers to the percentage of fault associated with the retrieved similar moving image and determines the percentage of fault of the accident recorded in the drive recorder moving image (Step S37).

Figure 4:
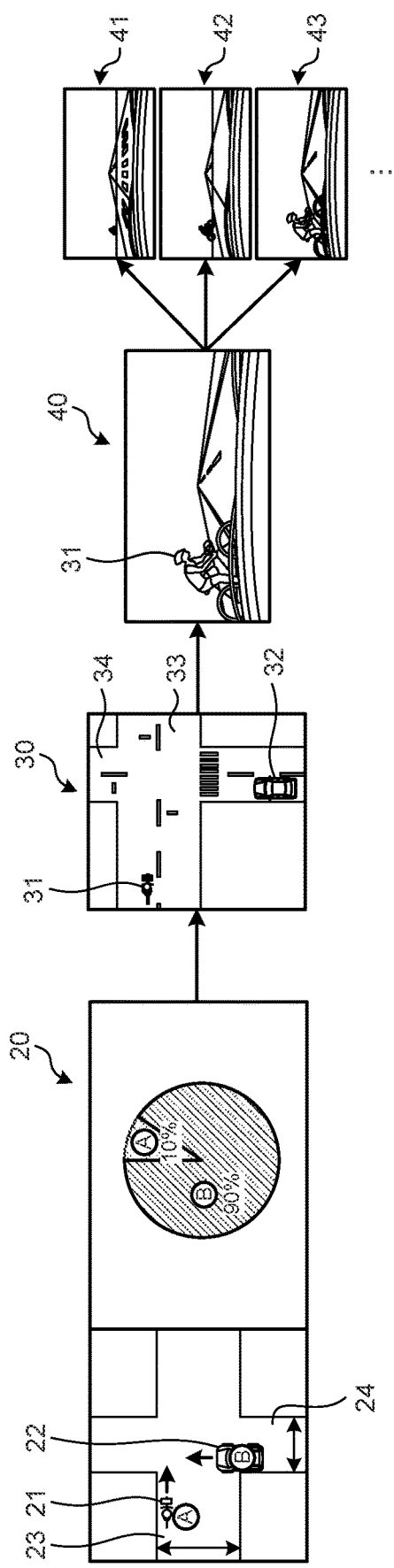
FIG. 4 is a view (3) for describing the information processing according to the embodiment.

Next, generation processing of the simulated moving image will be described with reference to FIG. 4. FIG. 4 is a view (3) for describing the information processing according to the embodiment. FIG. 4 is a view illustrating a process in which the information processing device 100 generates a learning moving image on the basis of an accident situation indicated in a fault percentage rule.

In the example illustrated in FIG. 4, a fault percentage rule 20 includes information of an accident situation and a percentage of fault between parties in this situation.

The accident situation includes information such as parties and a road condition. Although not illustrated in FIG. 4, the fault percentage rule 20 may include text data such as a description sentence indicating the accident situation and information such as a method of calculating the percentage of fault based on law of the country.

A situation of an accident in which a two-wheeled vehicle 21 (designated as a party A) collides with a four-wheeled vehicle 22 (designated as a party B), which travels on a relatively narrow road 24, when traveling on a relatively wide road 23 is illustrated in the example illustrated in FIG. 4. Under such a situation, the fault percentage rule 20 sets the percentage of fault of the party A to "10%" and the percentage of fault of the party B to "90%". Note that text data or the like for describing setting of the percentage of fault, such as "although the percentage of fault of "20:80" is generally applied in a case where the two-wheeled vehicle 21 and the four-wheeled vehicle 22 collide, since the two-wheeled vehicle 21 traveling on the wide road 23 is prioritized, the fault of the four-wheeled vehicle 22 traveling on the narrow road 24 is determined to be higher than usual in this case" may be added to the fault percentage rule.

When acquiring the fault percentage rule 20, the information processing device 100 generates arrangement data 30, in which a two-dimensional object is arranged, on the basis of the situation set in the fault percentage rule 20 and the text data such as the description sentence. Note that the generation of the arrangement data 30 may be manually executed by an administrator or the like of the information processing device 100, or may be automatically executed by the information processing device 100 that recognizes an arrangement of the parties or the like in the fault percentage rule 20 or analyzes the text data.

For example, the information processing device 100 arranges a two-wheeled vehicle object 31 corresponding to the two-wheeled vehicle 21, a four-wheeled vehicle object 32 corresponding to the four-wheeled vehicle 22, a road object 33 corresponding to the road 23, and a road object 34 corresponding to the road 24.

Then, the information processing device 100 performs 3D rendering of the arrangement data 30 and generates a simulated moving image 40. For example, the information processing device 100 sets a viewpoint of a camera in a front view from the four-wheeled vehicle object 32, and generates the simulated moving image 40 that causes animation until the four-wheeled vehicle object 32 collides with the two-wheeled vehicle object 31.

Furthermore, the information processing device 100 generates a learning moving image 41, a learning moving image 42, and a learning moving image 43 in each of which a viewpoint that is an example of the parameter is changed from the simulated moving image 40. Furthermore, the information processing device 100 may generate a learning moving image in which the size of the two-wheeled vehicle object 31 is changed, a learning moving image to which a sign object is added, a learning moving image in which weather or a time zone is changed, or the like. In such a manner, on the basis of the fault percentage rule 20, the information processing device 100 can generate learning moving images that are moving images to which the percentage of fault "10:90" is associated, and that indicate various situations.

Figure 5:
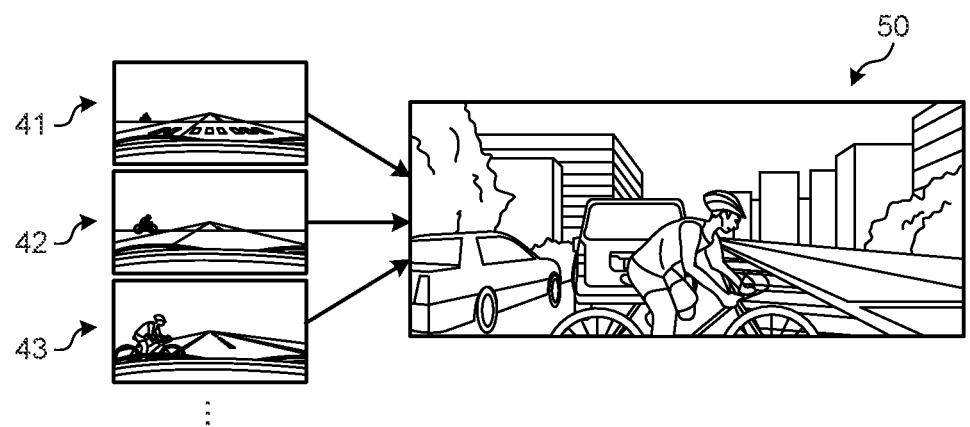
FIG. 5 is a view (4) for describing the information processing according to the embodiment.

Next, similarity determination processing between the drive recorder moving image and the learning moving image will be described with reference to FIG. 5. FIG. 5 is a view (4) for describing the information processing according to the embodiment. An example in which the information processing device 100 compares the learning moving image 41, the learning moving image 42, or the learning moving image 43 generated in advance with a drive recorder moving image 50 recording an actual accident is illustrated in FIG. 5.

That is, when acquiring the drive recorder moving image 50, the information processing device 100 extracts a feature amount of the drive recorder moving image 50, and searches for a learning moving image similar to the accident recorded in the drive recorder moving image 50. For example, in a case where the drive recorder moving image 50 is a moving image in which a collision with a bicycle is recorded by a drive recorder mounted on a four-wheeled vehicle, the information processing device 100 searches for the learning moving image 41, the learning moving image 42, and the learning moving image 43 as similar moving images. Furthermore, when necessary, the information processing device 100 determines which learning moving image is the most similar to the drive recorder moving image 50 among the retrieved moving images, and specifies a similar moving image. Note that the necessary case is, for example, a case where the percentages of fault associated with the retrieved learning moving image 41, learning moving image 42, and learning moving image 43 are different from each other.

Figure 6:
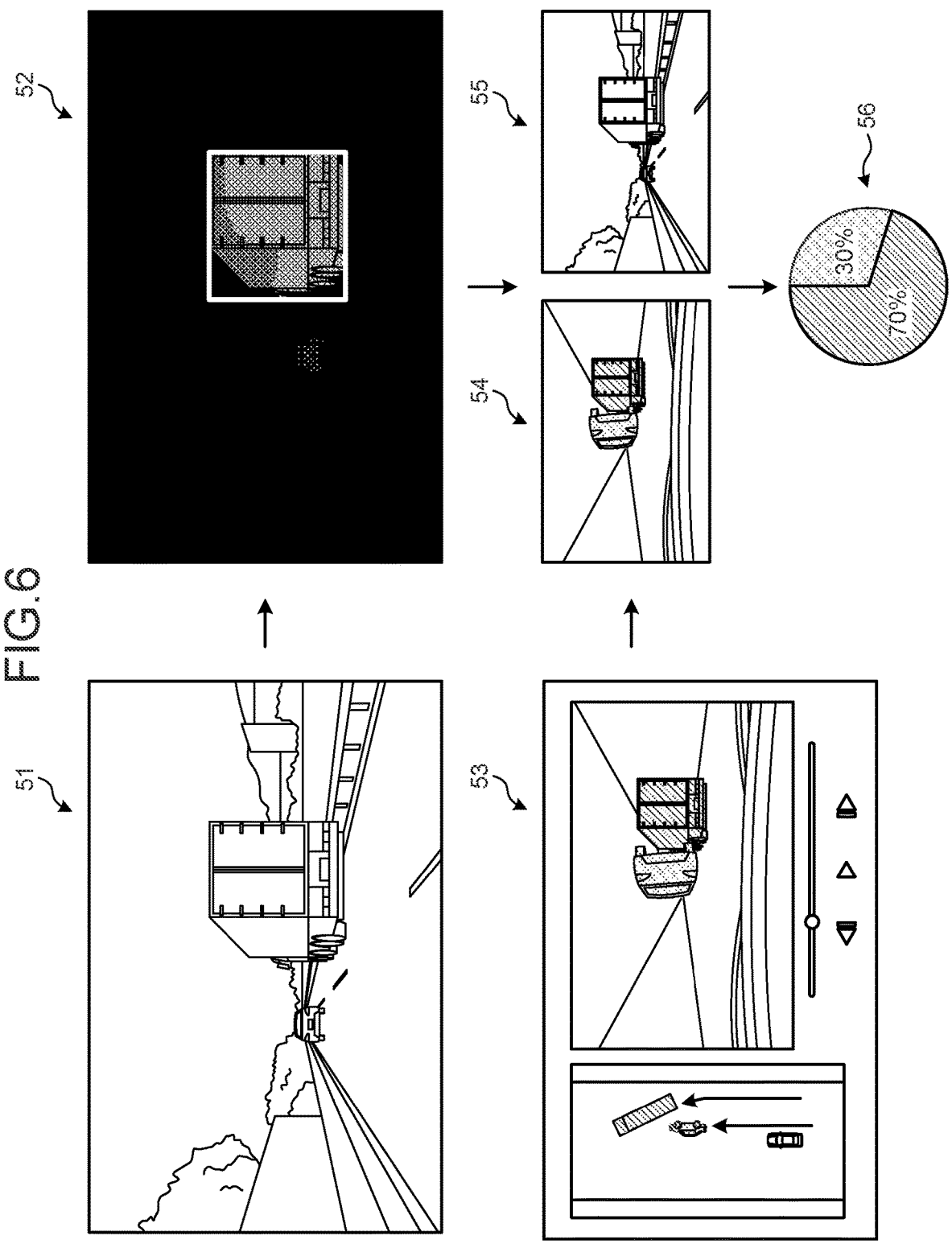
FIG. 6 is a view (5) for describing the information processing according to the embodiment.

Here, a flow of the processing of when the similarity between the drive recorder moving image and the learning moving image is determined will be described with reference to FIG. 6. FIG. 6 is a view (5) for describing the information processing according to the embodiment. An example in which the information processing device 100 compares a drive recorder moving image 51 recording an actual accident with a learning moving image 54 similar to the drive recorder moving image 51 is illustrated in FIG. 6.

In a case of acquiring the drive recorder moving image 51, the information processing device 100 may perform pre-processing instead of directly converting the drive recorder moving image 51 into a moving image vector. For example, the information processing device 100 generates a processed moving image 52 on which the pre-processing is performed. As an example, the information processing device 100 may extract a minimum necessary object such as a target object (vehicle or road in this example) by using a method called semantic segmentation, and mask other information in the moving image. As described above, many moving images having only simple 3D objects as components are generated as the learning moving images. Thus, the information processing device 100 can more accurately extract the similar moving image by performing comparison with the learning moving image by using the processed moving image 52 from which only the vehicle and the road are extracted.

Furthermore, the information processing device 100 may perform pre-processing such as previously extracting a portion corresponding to a record of the drive recorder moving image 51 in the learning moving image. For example, the information processing device 100 may extract a moving image for a several seconds before and after collision of vehicles from the drive recorder moving image 51 on an user interface 53 (such as an operation screen displayed on a display connected to the information processing device 100). Such processing may be manually performed by the administrator of the information processing device 100, or the information processing device 100 may perform image recognition processing or the like and automatically extract a scene in which the drive recorder moving image 51 and the learning moving image are similar to each other.

Then, the information processing device 100 compares the extracted learning moving image 54 with a moving image 55 on which the pre-processing is performed, and determines the similarity. Then, the information processing device 100 refers to the percentage of fault "30:70" associated with the similar learning moving image 54, and determines that a percentage of fault 56 in the accident recorded in the drive recorder moving image 51 is "30:70".

Figure 7:
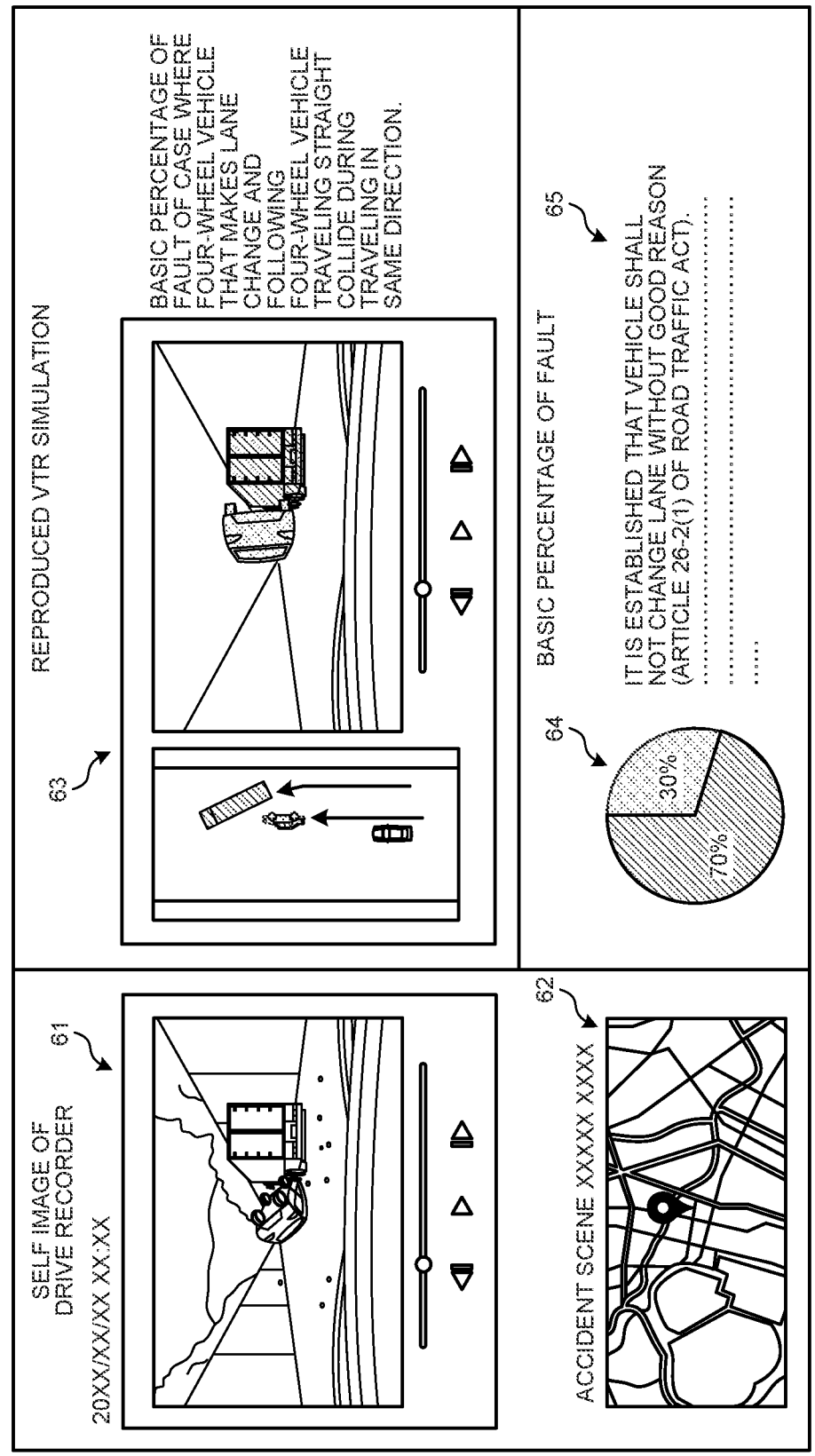
FIG. 7 is a view illustrating an example of a user interface according to the embodiment.

The determination processing illustrated in FIG. 6 may be displayed, for example, on a user interface provided by the information processing device 100 in such a manner that recognition by the user 10 is easy. This point will be described with reference to FIG. 7. FIG. 7 is a view illustrating an example of a user interface according to the embodiment. A user interface 60 displayed on the screen by the information processing device 100 is illustrated in FIG. 7.

In the example illustrated in FIG. 7, the user interface 60 displays a drive recorder moving image 61 provided by the user 10, a map 62 indicating a position of an accident scene and acquired by a global positioning system (GPS) or the like mounted on the vehicle 300, and the like. In addition, the user interface 60 displays a learning moving image 63 generated from the fault percentage rule, text data describing a situation of the learning moving image 63, and the like. In addition, the user interface 60 displays a graph 64 indicating the percentage of fault determined by the information processing device 100, text data 65 that describes laws, regulations, and the like of the country, which is a basis of when the fault percentage rule is set, and the like.

The user 10 or a person in charge of the insurance company can determine the final percentage of fault by reproducing the drive recorder moving image 61 and the learning moving image 63 or confirming the situation of the accident by operating the user interface 60. As a result, the person in charge of the insurance company can save time and effort in estimating the percentage of fault, and can improve accuracy of calculating the percentage of fault. Alternatively, the user 10 provides the drive recorder moving image 61 at the time of occurrence of the accident, and it is possible for a customer side to immediately know a standard of the percentage of fault related to the insurance.

(1-2. Configuration of an Information Processing Device According to the Embodiment)

Figure 8:
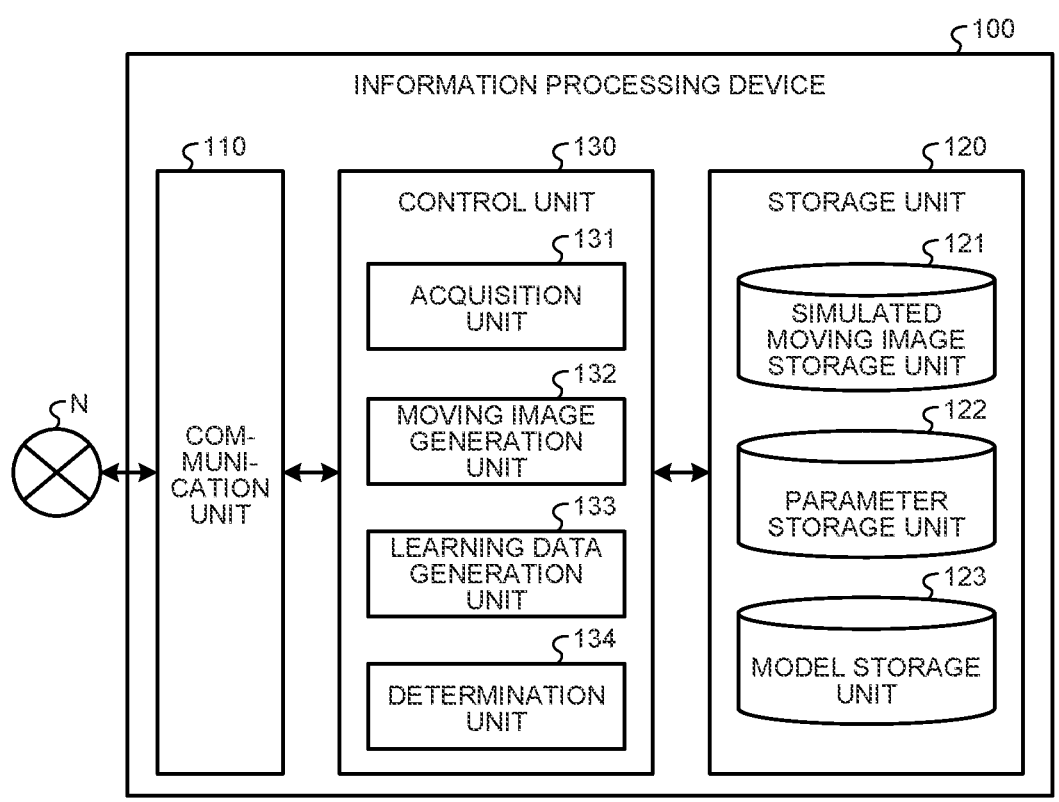
FIG. 8 is a view illustrating a configuration example of an information processing device according to the embodiment.

Next, the configuration of the information processing device 100 will be described. FIG. 8 is a view illustrating a configuration example of the information processing device 100 according to the embodiment.

As illustrated in FIG. 8, the information processing device 100 includes a communication unit 110, a storage unit 120, and a control unit 130. Note that the information processing device 100 includes an input unit (such as a keyboard or a mouse) that receives various kinds of operation from the administrator or the like who administers the information processing device 100, and a display unit (such as a liquid-crystal display) to display various kinds of information.

The communication unit 110 is realized by, for example, a network interface card (NIC), a network interface controller, or the like. The communication unit 110 is connected to a network N (such as the Internet) in a wired or wireless manner, and transmits and receives information to and from the insurance company server 200, the vehicle 300, the moving image management server 400, and the like via the network N.

The storage unit 120 is realized by a semiconductor memory element such as a random access memory (RAM) or a flash memory, or a storage device such as a hard disk or an optical disk, for example. The storage unit 120 includes a simulated moving image storage unit 121, a parameter storage unit 122, and a model storage unit 123.

Hereinafter, the storage units will be sequentially described with reference to FIG. 9 to FIG. 14.

Figure 9:
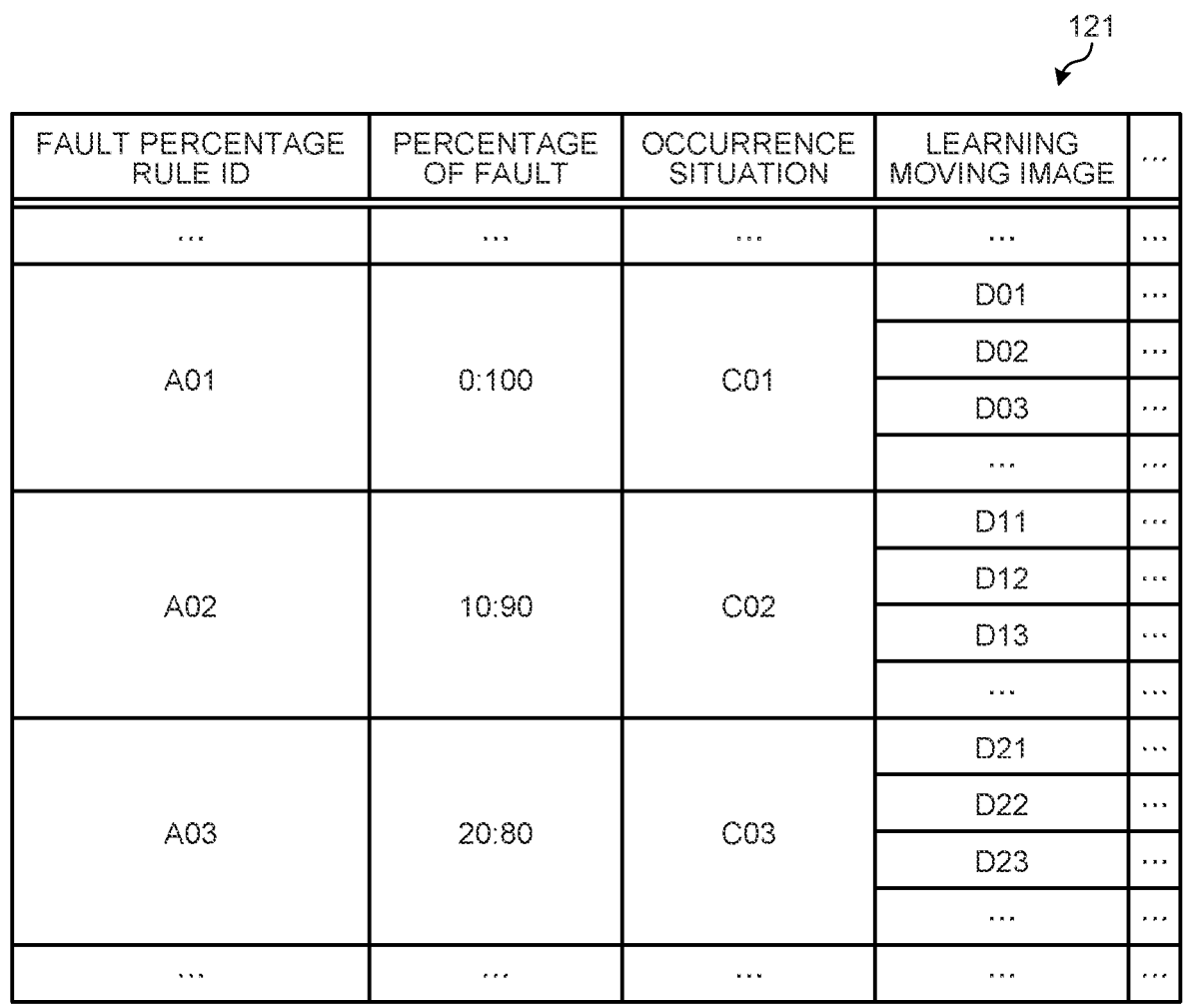
FIG. 9 is a view illustrating an example of a simulated moving image storage unit according to the embodiment.

FIG. 9 is a view illustrating an example of the simulated moving image storage unit 121 according to the embodiment. As illustrated in FIG. 9, the simulated moving image storage unit 121 stores a simulated moving image (learning moving image) generated for each fault percentage rule. In the example illustrated in FIG. 9, the simulated moving image storage unit 121 includes items such as a "fault percentage rule ID", a "percentage of fault", an "occurrence situation", and a "learning moving image". Note that although information stored in the storage unit 120 may be conceptually indicated as "A01" or "C01" in FIG. 9 to FIG. 14, each piece of information described later is stored in the storage unit 120 in practice.

The "fault percentage rule ID" is identification information for identifying the fault percentage rule. The "percentage of fault" is a numerical value of the percentage of fault set in the fault percentage rule.

The "occurrence situation" is information that indicates an occurrence situation of an assumed accident and that is included in the fault percentage rule. For example, as illustrated in FIG. 4, the occurrence situation is information indicating a situation in which an accident has occurred, such as information of parties of the accident, a road condition, and speeds at which the parties have been traveling. Note that the "occurrence situation" may include text data describing the situation of the accident, text data indicating a background and a reason of setting of the percentage of fault, and the like.

The "learning moving image" indicates a simulated moving image and a learning moving image generated on the basis of the fault percentage rule. Note that the learning moving image may be stored as moving image data or may be stored as a moving image vector. As illustrated in FIG. 9, the information processing device 100 stores a plurality of learning moving images in association with one fault percentage rule.

Next, the parameter storage unit 122 will be described. FIG. 10 is a view (1) illustrating an example of the parameter storage unit according to the embodiment. A data table 122A that stores parameters related to objects as examples of parameters is illustrated in FIG. 10.

In the example illustrated in FIG. 10, the data table 122A includes items such as an "object ID", an "attribute", and a "type". The "object ID" indicates identification information for identifying an object. The "attribute" indicates an attribute of the object. The attribute of the object is information indicating what kind of substance the object is, and is, for example, information such as a vehicle, a light vehicle, or a person. The "type" indicates information acquired by further classification of the attribute in detail. Examples of the type of the vehicle include a sedan, a light car, and a minivan.

For example, the information processing device 100 selects an object the "attribute" of which is the "vehicle" when a vehicle is included in components at the time of arrangement of the object to generate the learning moving image. Note that each object includes information related to a size and shape indicating the size at the time of two-dimensional arrangement or 3D rendering. Then, the information processing device 100 generates a large quantity of different learning moving images by sequentially changing an object the "attribute" of which is the vehicle.

Next, another example of the parameter storage unit 122 will be described. FIG. 11 is a view (2) illustrating an example of the parameter storage unit according to the embodiment. A data table 122B in which parameters related to objects other than the parties are stored as examples of the parameters is illustrated in FIG. 11.

In the example illustrated in FIG. 11, the data table 122B includes items such as an "object ID", an "attribute", and a "type". Each item corresponds to a similar item illustrated in FIG. 10.

For example, in a case where an object other than parties, such as a sign is arranged at the time of generation of a learning moving image, the information processing device 100 selects an object the "attribute" of which is a "substance". As an example, after arranging an object such as a vehicle, the information processing device 100 additionally arranges a substance object such as a traffic light or a sign. As a result, the information processing device 100 can further increase variations of the learning moving image.

Next, another example of the parameter storage unit 122 will be described. FIG. 12 is a view (3) illustrating an example of the parameter storage unit according to the embodiment. A data table 122C that stores parameters related to a road as examples of parameters is illustrated in FIG. 12.

In the example illustrated in FIG. 12, the data table 122C includes items such as an "object ID", an "attribute", and a "type". Each item corresponds to a similar item illustrated in FIG. 10.

For example, when generating a learning moving image, the information processing device 100 arranges an object corresponding to a party and arranges an object the "attribute" of which is a "road" and which corresponds to a road on which the party is located or travels. As illustrated in FIG. 12, since the object corresponding to the road includes data such as a sign, a traffic light, and a crosswalk, the information processing device 100 can generate moving images in which the sign, the traffic light, the crosswalk, and the like are arranged differently.

Next, another example of the parameter storage unit 122 will be described. FIG. 13 is a view (4) illustrating an example of the parameter storage unit according to the embodiment. A data table 122D in which parameters related to behavior of a party are stored as examples of parameters is illustrated in FIG. 13.

In the example illustrated in FIG. 13, the data table 122D includes items such as an "animation ID", an "attribute", and a "type". The "animation ID" indicates identification information for identifying an animation representing behavior of a party.

For example, when generating a learning moving image, the information processing device 100 arranges an object corresponding to the party and sets an animation corresponding to the behavior of the party as a parameter. For example, in a case where a situation such as "a vehicle goes straight on a road and collides with a pedestrian" is set in the fault percentage rule, the information processing device 100 selects an animation corresponding to the behavior and sets the animation in the corresponding object. As a result, the information processing device 100 can generate a moving image in which the object behaves in the set manner.

Next, another example of the parameter storage unit 122 will be described. FIG. 14 is a view (5) illustrating an example of the parameter storage unit according to the embodiment. A data table 122E in which parameters related to speed and acceleration of a party are stored as examples of parameters is illustrated in FIG. 14.

In the example illustrated in FIG. 14, the data table 122E includes items such as a "speed parameter ID", an "attribute", and "speed/acceleration data". The "speed parameter ID" indicates identification information for identifying setting information in which speed or acceleration at which a party moves is set in an animation expressing behavior of the party. The "speed/acceleration data" indicates a specific numerical value of the speed or acceleration at which the party moves.

For example, when generating a learning moving image, the information processing device 100 arranges an object corresponding to the party and sets an animation corresponding to the behavior of the party as a parameter. Furthermore, the information processing device 100 sets, as a parameter, information in which the speed or acceleration of the movement of the party is set. As a result, the information processing device 100 can generate a large quantity of images with a wide variety of variations in which the timing and situation of collision of a vehicle with a pedestrian are slightly different from each other, whereby it is possible to increase a probability of generating a learning moving image similar to an actual accident moving image.

Returning to FIG. 8, the description will be continued. The control unit 130 is realized by, for example, a central processing unit (CPU), a micro processing unit (MPU), a graphics processing unit (GPU), or the like executing a program (such as an information processing program according to the present disclosure) stored inside the information processing device 100 with a random access memory (RAM) or the like as a work area. Also, the control unit 130 is a controller, and may be realized by an integrated circuit such as an application specific integrated circuit (ASIC) or a field programmable gate array (FPGA), for example.

As illustrated in FIG. 8, the control unit 130 includes an acquisition unit 131, a moving image generation unit 132, a learning data generation unit 133, and a determination unit 134.

The acquisition unit 131 acquires the fault percentage rule that indicates the percentage of fault of the party in the accident and that is determined according to the situation at the time of occurrence of the accident. For example, the acquisition unit 131 acquires the fault percentage rule from the insurance company server 200 when the insurance company server 200 newly sets or updates the fault percentage rule.

In addition, in a case where the determination processing of the percentage of fault is performed, the acquisition unit 131 acquires, as a moving image to be determined, the drive recorder moving image recorded by the vehicle 300 at the time of occurrence of the accident. For example, the acquisition unit 131 acquires the drive recorder moving image in response to a request from the user 10 who is the policyholder or in response to the vehicle 300 sensing an impact exceeding a predetermined threshold. Specifically, the acquisition unit 131 acquires the drive recorder moving image from the moving image management server 400 that acquires the drive recorder moving image uploaded from the vehicle 300.

The moving image generation unit 132 generates a simulated moving image assuming a situation at the time of occurrence of the accident which situation corresponds to the fault percentage rule. Specifically, the moving image generation unit 132 arranges components such as a party as an object in a simulation environment imitating the situation at the time of occurrence of the accident, performs 3D rendering, and generates a simulated moving image imitating the situation at the time of occurrence of the accident.

That is, the moving image generation unit 132 generates a simulated moving image by using, as a component, at least one of an attribute of the party of the accident, a scene situation of the accident, or an operation condition of the party in the accident as the situation at the time of occurrence of the accident which situation corresponds to the fault percentage rule.

Specifically, the moving image generation unit 132 generates a simulated moving image by using, as a component, at least one of whether the party has been in a vehicle (whether being a vehicle or a pedestrian, for example), an age of the party (whether being an adult or a child, for example), or a type of the vehicle in which the party has been in (such as a vehicle type) as the attribute of the party involved in the accident. For example, the moving image generation unit 132 refers to the data table 122A and generates a simulated moving image by using, as components, objects that are stored in the data table 122A and that have different attributes and types. The learning data generation unit 133 (described later) treats the objects as changeable parameters, and generates various learning moving images by sequentially changing the objects stored in the data table 122A and having different attributes and types.

Furthermore, the moving image generation unit 132 may generate the simulated moving image by using, as a component, at least one of a size, classification, and visibility of a road at the time of occurrence of the accident, priority of intersecting roads, presence or absence of a traffic light, time of occurrence of the accident, or presence or absence of an obstacle as the scene situation of the accident. For example, the moving image generation unit 132 refers to the data table 122B and the data table 122C, and generates the simulated moving image with the objects stored in each table as components.

Furthermore, the moving image generation unit 132 may generate the simulated moving image by using, as a component, at least one of a traveling speed, acceleration, or a moving route of the party as the operation condition of the party in the accident. For example, the moving image generation unit 132 refers to the data table 122D and the data table 122E, and generates the simulated moving image by using an animation and speed data stored in each table as components.

Furthermore, the moving image generation unit 132 may generate the simulated moving image by using at least one of a direction or a distance of a viewpoint of when the situation at the time of occurrence of the accident is looked down as a component. Specifically, the moving image generation unit 132 generates the simulated moving image with a position, focal length, or the like of a camera at the time of 3D rendering as one of the components.

The learning data generation unit 133 generates learning data in which a learning moving image acquired by changing of components, which are included in the simulated moving image, as parameters is associated with the percentage of fault.

For example, the learning data generation unit 133 generates the learning moving image by referring to each of the parameters stored in the parameter storage unit 122 and variously changing the components of the simulated moving image. Note that since the original simulated moving image is generated on the basis of the fault percentage rule, the information processing device 100 can acquire the percentage of fault corresponding to each simulated moving image. The information processing device 100 can generate a large quantity of learning data, in which the percentage of fault and the learning moving image are combined, from one fault percentage rule by associating the same percentage of fault as the simulated moving image to a newly generated learning moving image.

Furthermore, the learning data generation unit 133 generates a moving image determination model for determining which learning moving image a target moving image is similar to by using the generated learning data.

Specifically, the learning data generation unit 133 can learn a model of estimating a moving image that is the most similar to the target moving image (such as the drive recorder moving image) as a simple video collation task on the basis of the large quantity of learning data generated from the one fault percentage rule.

Note that the learning data generation unit 133 may employ any known learning method as long as a model is for determining similarity of the moving images.

As an example, the learning data generation unit 133 may generate the moving image determination model by using a method of generating a moving image classifier called a C3D model. According to such a method, a three-dimensional feature amount to which a time direction is added can be learned from data in addition to a two-dimensional convolutional neural network (CNN). Thus, a model or the like that accurately performs feature recognition in the moving image (such as person recognition in the moving image) can be generated.

Alternatively, the learning data generation unit 133 may employ a learning method called temporal cycle-consistency learning in which correspondence relationship is found and alignment is performed across a plurality of moving images. According to such a method, since a correlation of vector positions for each video frame can be acquired in time series, it is possible to grasp what positional relationship the target moving image and the learning moving image have in a vector space. Thus, the information processing device 100 can specify which learning moving image the target moving image is similar to.

Furthermore, instead of using data of the moving image itself, the learning data generation unit 133 may employ a method of converting a vehicle or a person in the moving image into skeleton information and using a classification model with a graph structure as an input, such as Spatial Temporal Graph Convolutional Networks (STGCN). According to such a method, the learning data generation unit 133 can generate a more accurate deep neural network (DNN) model from which noise such as background information included in the moving image is removed. Furthermore, the learning data generation unit 133 may employ a method of improving recognizability by regarding feature points (landmarks) of a face of a person as connected graphs and performing an input thereof to GCN.

The determination unit 134 determines the percentage of fault in the accident corresponding to the drive recorder moving image by inputting the drive recorder moving image to the model. Specifically, the determination unit 134 inputs the drive recorder moving image to the moving image determination model, and specifies the most similar learning moving image on the basis of the output result. Then, the determination unit 134 refers to the percentage of fault associated with the specified learning moving image and determines the percentage of fault in the accident recorded in the drive recorder moving image.

Furthermore, the determination unit 134 may calculate the insurance of the accident corresponding to the drive recorder moving image on the basis of the insurance contract information of the user 10 who is the transmission source of the drive recorder moving image and the determined percentage of fault. For example, the determination unit 134 refers to the insurance contract information of the user 10, which information is transmitted together with the drive recorder moving image, and acquires information related to insurance to be paid in a case where the accident occurs. Then, the determination unit 134 calculates the insurance estimated to be paid to the user 10 on the basis of the determined percentage of fault. As a result, immediately after the accident occurs, the user 10 can know the insurance automatically determined on the basis of the drive recorder moving image.

(1-3. Configuration of an Insurance Company Server According to the Embodiment)

Figure 15:
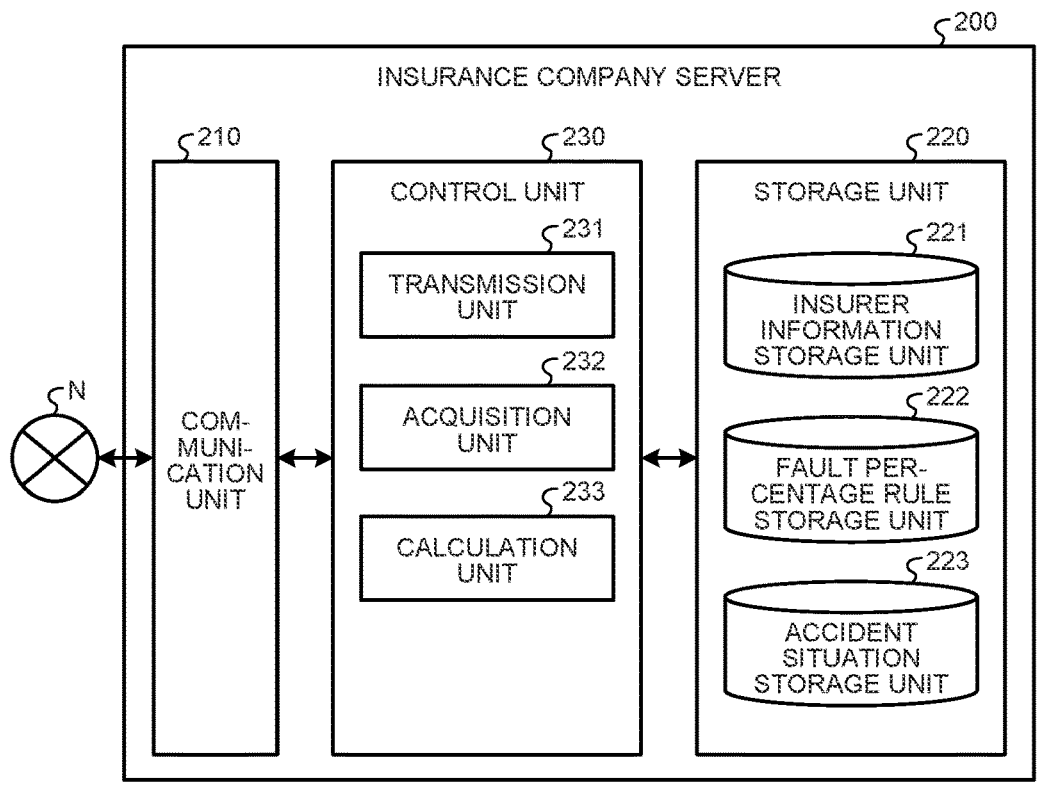
FIG. 15 is a view illustrating a configuration example of an insurance company server according to the embodiment.

Next, a configuration of the insurance company server 200 will be described. FIG. 15 is a view illustrating a configuration example of the insurance company server 200 according to the embodiment.

As illustrated in FIG. 15, the insurance company server 200 includes a communication unit 210, a storage unit 220, and a control unit 230. Note that the insurance company server 200 may include an input unit (such as a keyboard or a mouse) that receives various kinds of operation from an administrator or the like who administers the insurance company server 200, and a display unit (such as a liquid crystal display) for displaying various kinds of information.

The communication unit 210 is realized by, for example, an NIC, a network interface controller, or the like. The communication unit 210 is connected to the network N in a wired or wireless manner, and transmits/receives information to/from the information processing device 100, the vehicle 300, the moving image management server 400, and the like via the network N.

The storage unit 220 is realized, for example, by a semiconductor memory element such as a RAM or a flash memory, or a storage device such as a hard disk or an optical disk. The storage unit 220 includes an insurer information storage unit 221, a fault percentage rule storage unit 222, and an accident situation storage unit 223.

The insurer information storage unit 221 stores information related to insurance between the insurance company server 200 and the policyholder. For example, the insurer information storage unit 221 stores information such as personal information of the policyholder, a kind of accident for which insurance is to be paid, an amount of the insurance, and the like.

The fault percentage rule storage unit 222 stores information such as a percentage of fault set by the insurance company and a situation of an accident assumed in a case corresponding to the percentage of fault.

The accident situation storage unit 223 stores data such as a situation of an actual accident and a result of a percentage of fault between parties of the accident. For example, in a case where occurrence of an accident is received from the user 10, the accident situation storage unit 223 stores a user ID for identifying the user, a moving image ID for identifying a drive recorder moving image recording the accident, insurance contract information of the user 10, and the like in association. Furthermore, the insurance company server 200 may set a new fault percentage rule with reference to, for example, past information stored in the accident situation storage unit 223.

The control unit 230 is realized by, for example, a CPU, an MPU, a GPU, or the like executing a program stored inside the insurance company server 200 with a RAM or the like as a work area. Furthermore, the control unit 230 is a controller, and may be realized by, for example, an integrated circuit such as an ASIC or an FPGA.

As illustrated in FIG. 15, the control unit 230 includes a transmission unit 231, an acquisition unit 232, and a calculation unit 233.

The transmission unit 231 transmits, to the information processing device 100, the fault percentage rule that indicates the percentage of fault of the parties of the accident, and that is determined according to the situation at the time of occurrence of the accident.

By using the moving image determination model generated on the basis of the fault percentage rule transmitted by the transmission unit 231, the acquisition unit 232 acquires the percentage of fault determined in the drive recorder moving image recording the situation of when the accident actually occurs.

The calculation unit 233 calculates insurance of the accident corresponding to the drive recorder moving image on the basis of the percentage of fault acquired by the acquisition unit 232. For example, the calculation unit 233 calculates the insurance to be paid to the user 10 who is the transmission source of the drive recorder moving image by multiplying the percentage of fault acquired from the information processing device 100 by the insurance stored in the insurer information storage unit 221. Note that as described above, the calculation of the insurance may be executed by the information processing device 100.

(1-4. Configuration of a Vehicle According to the Embodiment)

Figure 16:
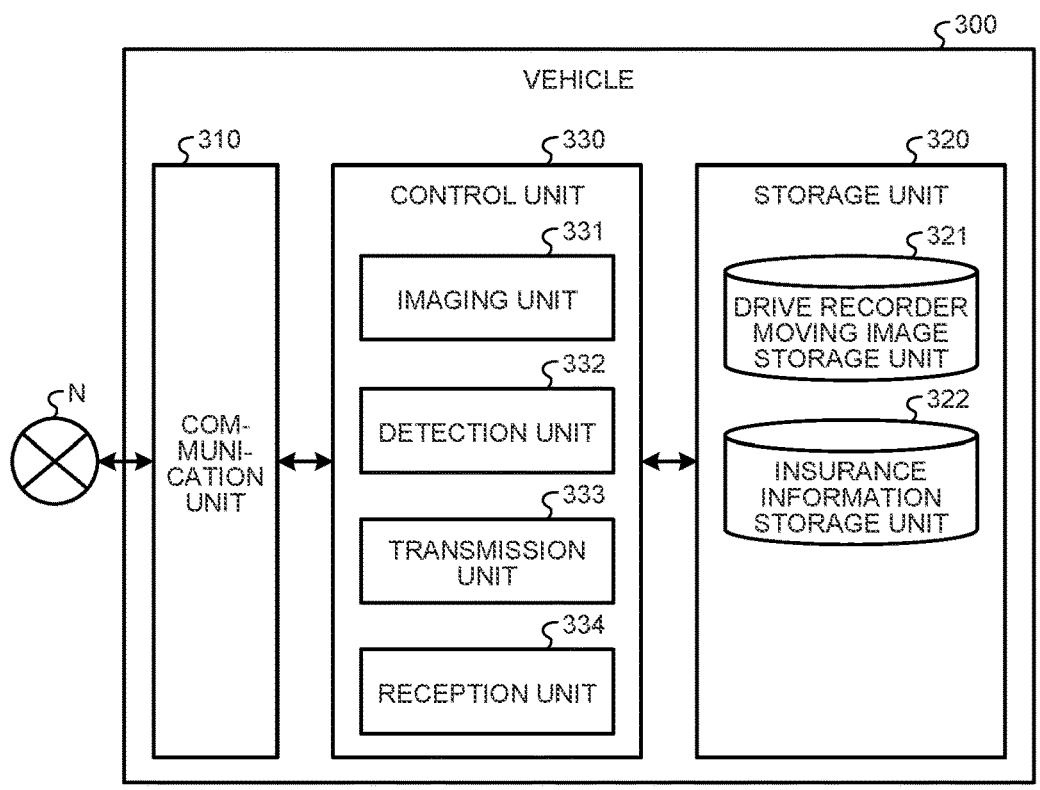
FIG. 16 is a view illustrating a configuration example of a vehicle according to the embodiment.

Next, a configuration of the vehicle 300 will be described. FIG. 16 is a view illustrating a configuration example of the vehicle 300 according to the embodiment.

As illustrated in FIG. 16, the vehicle 300 includes a communication unit 310, a storage unit 320, and a control unit 330. Note that the vehicle 300 may include an input unit (such as a touch panel) that receives various kinds of operation from the user 10 who drives the vehicle 300, and a display unit (such as a liquid crystal display) for displaying various kinds of information.

The communication unit 310 is realized by, for example, a network interface controller or the like. The communication unit 310 is wirelessly connected to the network N, and transmits/receives information to/from the information processing device 100, the insurance company server 200, the moving image management server 400, and the like via the network N.

The storage unit 320 is realized, for example, by a semiconductor memory element such as a RAM or a flash memory, or a storage device such as a hard disk or an optical disk. The storage unit 320 includes a drive recorder moving image storage unit 321 and an insurance information storage unit 322.

The drive recorder moving image storage unit 321 stores a moving image captured by a drive recorder (camera) installed in the vehicle 300 while the vehicle 300 travels.

The insurance information storage unit 322 stores information related to an insurance contract concluded between the user 10 and the insurance company. For example, the insurance information storage unit 322 stores a user ID for identifying the user 10 who is the policyholder, information of the insurance company that is a place of contact in a case where the accident occurs, information of a delivery destination to which the drive recorder moving image is delivered in a case where the accident occurs, and the like.

The control unit 330 is realized by, for example, a CPU, an MPU, a GPU, or the like executing a program stored inside the vehicle 300 with a RAM or the like as a work area. Furthermore, the control unit 330 is a controller, and may be realized by, for example, an integrated circuit such as an ASIC or an FPGA.

As illustrated in FIG. 16, the control unit 330 includes an imaging unit 331, a detection unit 332, a transmission unit 333, and a reception unit 334.

The imaging unit 331 images an external environment viewed from the vehicle. Specifically, the imaging unit 331 controls the drive recorder mounted on the vehicle 300, and images an external situation while the vehicle 300 is traveling. The imaging unit 331 appropriately stores a moving image acquired by the imaging into the drive recorder moving image storage unit 321.

The detection unit 332 detects various phenomena related to the vehicle 300. For example, the detection unit 332 controls an acceleration sensor and an impact detection sensor mounted on the vehicle 300, and detects an abnormality related to the vehicle 300. As an example, the detection unit 332 detects that an impact equal to or greater than a predetermined threshold is applied to the vehicle 300.

The transmission unit 333 transmits the drive recorder moving image captured by the imaging unit 331 to the information processing device 100 via the moving image management server 400. For example, when the detection unit 332 detects an impact on the vehicle 300, the transmission unit 333 transmits a moving image captured by the imaging unit 331 before and after the impact to the information processing device 100 as the drive recorder moving image recording the accident. That is, in a case of detecting the situation in which the accident is estimated to have occurred, the transmission unit 333 automatically transmits the drive recorder moving image to the information processing device 100. As a result, the user 10 can quickly know the percentage of fault of the accident. Note that as described above, the transmission unit 333 may transmit the drive recorder moving image to the information processing device 100 in response to a request from the user 10 or the person in charge of the insurance company.

The reception unit 334 receives the percentage of fault in the accident which percentage of fault is determined by the information processing device 100 on the basis of the drive recorder moving image transmitted by the transmission unit 333.

(1-5. Procedure of Processing According to the Embodiment)

Figure 17:
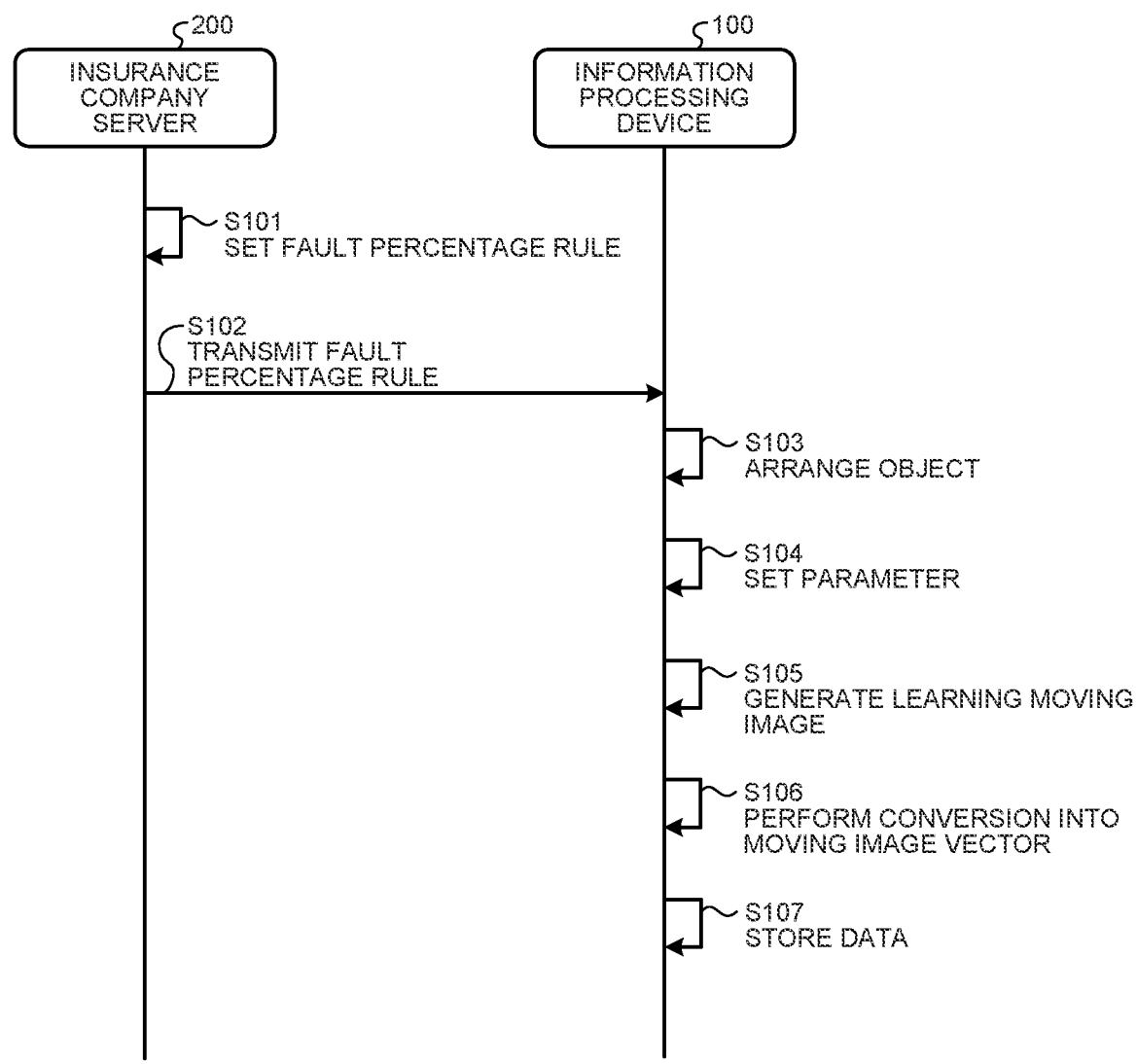
FIG. 17 is a sequence diagram (1) illustrating a flow of processing according to the embodiment.

Next, the procedure of the processing according to the embodiment will be described with reference to FIG. 17 to FIG. 19. First, a procedure of learning processing according to the embodiment will be described with reference to FIG. 17. FIG. 17 is a sequence diagram (1) illustrating a flow of the processing according to the embodiment.

As illustrated in FIG. 17, the insurance company server 200 sets the fault percentage rule (Step S101). The insurance company server 200 transmits the set fault percentage rule to the information processing device 100 (Step S102).

According to the acquired fault percentage rule, the information processing device 100 arranges objects in a virtual space for generating the simulated moving image (Step S103). Furthermore, the information processing device 100 sets a parameter for changing each of the objects (Step S104). Then, the information processing device 100 sequentially changes the parameter and generates learning moving images (Step S105).

Subsequently, the information processing device 100 inputs the learning moving images to an arbitrary moving image determination model generated by learning of the learning moving images, and converts each of the learning moving images into a moving image vector (Step S106). The information processing device 100 stores data such as the generated moving image vectors in the storage unit 120 (Step S107).

Next, a procedure of transmission processing according to the embodiment will be described with reference to FIG. 18. FIG. 18 is a sequence diagram (2) illustrating a flow of the processing according to the embodiment.

Figure 18:
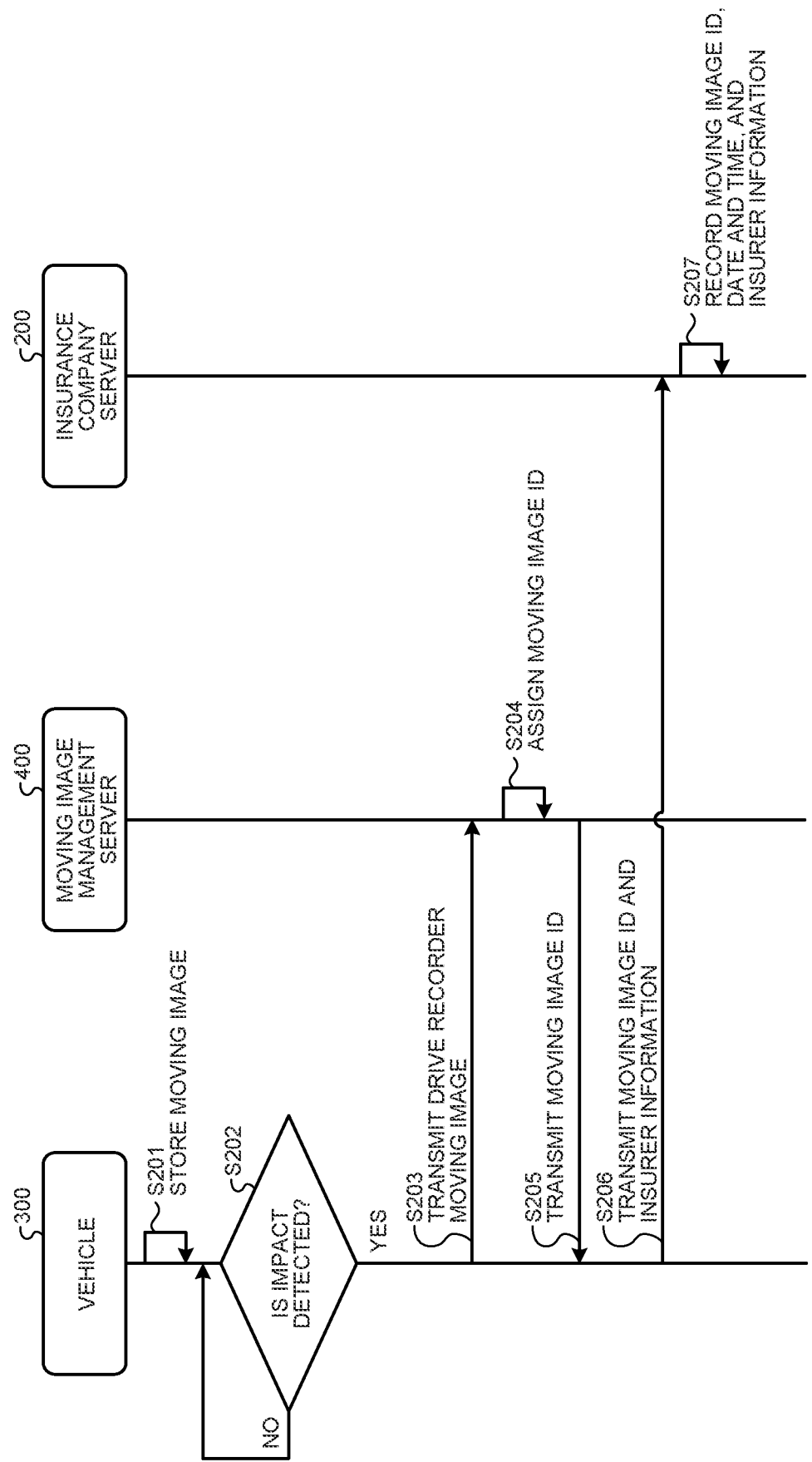
FIG. 18 is a sequence diagram (2) illustrating a flow of the processing according to the embodiment.

As illustrated in FIG. 18, the vehicle 300 keeps storing a moving image by using a drive recorder while traveling (Step S201). Then, the vehicle 300 determines whether an impact equal to or greater than a predetermined threshold is detected during traveling (Step S202). When no impact is detected (Step S202; No), the vehicle 300 keeps storing the moving image. On the other hand, in a case where the impact is detected (Step S202; Yes), the vehicle 300 transmits the drive recorder moving image stored before and after the impact to the moving image management server 400 (Step S203).

When acquiring the drive recorder moving image, the moving image management server 400 assigns a moving image ID in such a manner that the acquired drive recorder moving image can be identified (Step S204). The moving image management server 400 transmits the assigned moving image ID to the vehicle 300 (Step S205).

When acquiring the moving image ID, the vehicle 300 transmits the moving image ID and insurer information of the user 10 to the insurance company server 200 (Step S206). As a result, the insurance company server 200 can detect possibility that an accident has occurred in the vehicle 300. The insurance company server 200 records the moving image ID acquired from the vehicle 300, the date and time when the moving image is stored, the insurer information, and the like in the storage unit 220 in association with each other (Step S207).

Next, a procedure of determination processing according to the embodiment will be described with reference to FIG. 19. FIG. 19 is a sequence diagram (3) illustrating a flow of the processing according to the embodiment.

Figure 19:
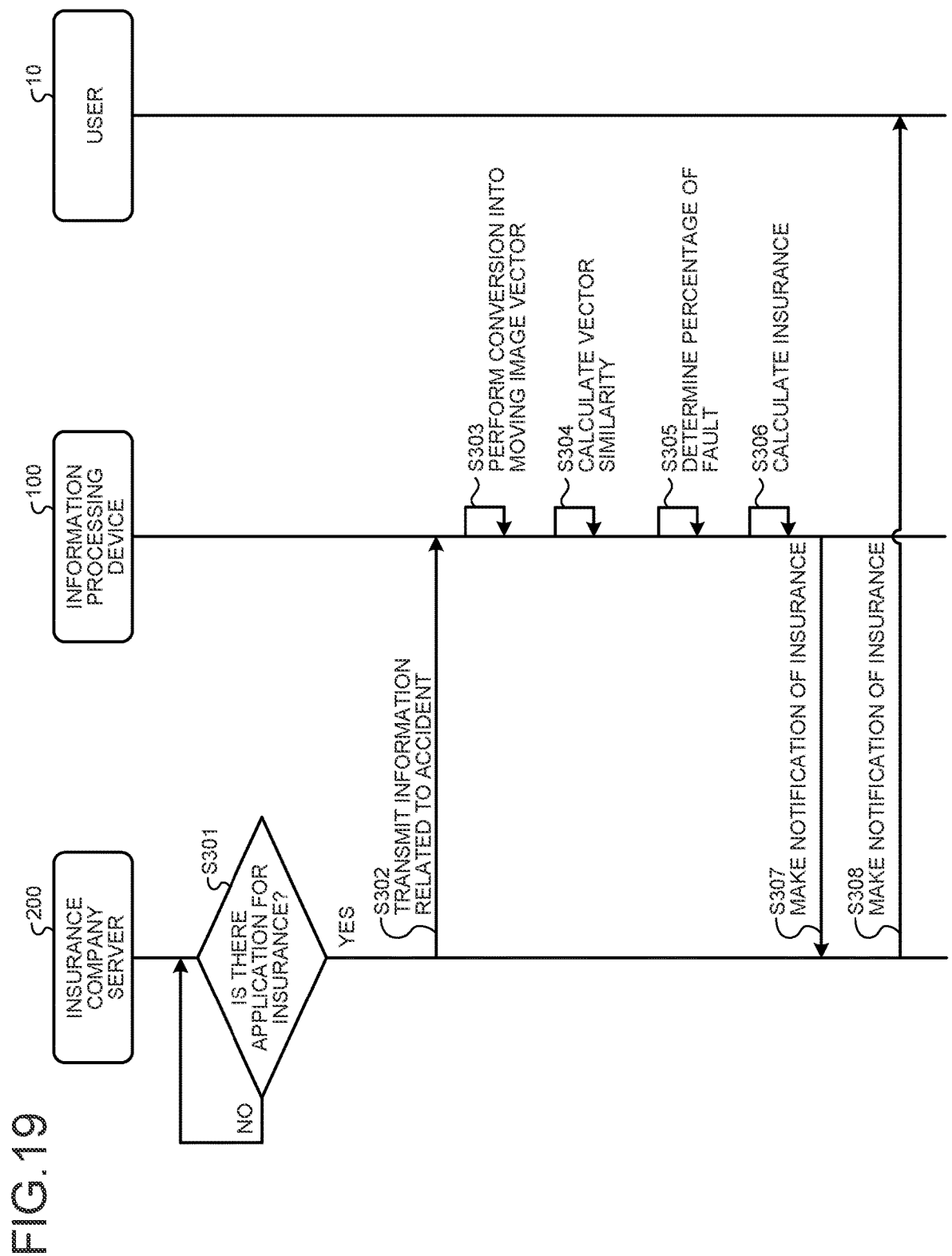
FIG. 19 is a sequence diagram (3) illustrating a flow of the processing according to the embodiment.

As illustrated in FIG. 19, the insurance company server 200 determines whether there is an application related to insurance calculation from the user 10 or the like (Step S301). In a case where there is no application (Step S301; No), the insurance company server 200 waits until there is an application. On the other hand, in a case where there is the application (Step S301; Yes), the insurance company server 200 transmits the information that is related to the accident and recorded in Step S207 to the information processing device 100 (Step S302).

When acquiring the information related to the accident from the insurance company server 200, the information processing device 100 acquires the drive recorder moving image from the moving image management server 400 on the basis of the moving image ID. Then, the information processing device 100 converts the drive recorder moving image into a moving image vector (Step S303). Subsequently, the information processing device 100 calculates vector similarity between the moving image vector corresponding to the drive recorder moving image and the moving image vector corresponding to each of the learning moving images (Step S304), and specifies a similar learning moving image.

The information processing device 100 determines the percentage of fault of the accident on the basis of the specified learning moving image (Step S305). Subsequently, the information processing device 100 calculates the insurance of the accident on the basis of the percentage of fault (Step S306).

The information processing device 100 notifies the insurance company server 200 of the calculated insurance (Step S307). The insurance company server 200 notifies the user 10 of the insurance calculated by the information processing device 100 (Step S308).

2. Other Embodiments

The processing according to each of the above-described embodiments may be carried out in various different forms other than each of the above-described embodiments.

In each of the above embodiments, an example in which the vehicle 300 executes information processing such as transmitting a drive recorder moving image has been described. However, the information processing executed by the vehicle 300 may be executed by, for example, a smartphone or the like held by the user 10. Furthermore, although an example in which the vehicle 300 is a four-wheeled automobile has been described in the embodiment, the vehicle 300 may be a two-wheeled bicycle or the like in which a camera is installed. That is, the vehicle 300 is not limited to a four-wheeled automobile as long as a moving image during traveling can be recorded.

Furthermore, although a plurality of examples in which a moving image determination model is created by learning by a method such as CNN has been described in each of the above embodiments, the learning method is not limited thereto, and various known methods may be used.

Also, among the pieces of processing described in the above embodiments, all or a part of the processing described to be automatically performed can be manually performed, or all or a part of the processing described to be manually performed can be automatically performed by a known method. In addition, a processing procedure, specific name, and information including various kinds of data and parameters illustrated in the above document or drawings can be arbitrarily changed unless otherwise specified. For example, various kinds of information illustrated in each of the drawings are not limited to the illustrated information.

In addition, each component of each of the illustrated devices is a functional concept, and does not need to be physically configured in the illustrated manner. That is, a specific form of distribution/integration of each device is not limited to what is illustrated in the drawings, and a whole or part thereof can be functionally or physically distributed/integrated in an arbitrary unit according to various loads and usage conditions. For example, the moving image generation unit 132 and the learning data generation unit 133 may be integrated. Alternatively, the information processing device 100, the insurance company server 200, and the moving image management server 400 may be integrated.

Also, the above-described embodiments and modification examples can be arbitrarily combined in a range in which the processing contents do not contradict each other.

Also, the effect described in the present description is merely an example and is not a limitation, and there may be another effect.

(3. Effects of an Information Processing Device According to the Present Disclosure)

As described above, the information processing device (information processing device 100 in the embodiment) according to the present disclosure includes the acquisition unit (acquisition unit 131 in the embodiment), the moving image generation unit (moving image generation unit 132 in the embodiment), and the learning data generation unit (learning data generation unit 133 in the embodiment). The acquisition unit acquires the fault percentage rule that indicates the percentage of fault of the party in the accident and that is determined according to the situation at the time of occurrence of the accident. The moving image generation unit generates a simulated moving image assuming a situation at the time of occurrence of the accident which situation corresponds to the fault percentage rule. The learning data generation unit generates learning data in which a learning moving image acquired by changing of components included in the simulated moving image as parameters is associated with the percentage of fault.

In such a manner, the information processing device according to the present disclosure generates the learning moving image by changing a component as a parameter for a situation set in one fault percentage rule. As a result, since the information processing device can generate a large quantity of moving images that represent the accident and that are generally likely to be insufficient, it is possible to perform learning of a deep neural network or the like without insufficiency of training data. That is, the information processing device can acquire learning data for model generation for quickly and accurately determining the percentage of fault in the actual accident.

In addition, the moving image generation unit generates a simulated moving image by using, as a component, at least one of an attribute of a party of the accident, a scene situation of the accident, or an operation condition of the party in the accident as the situation at the time of occurrence of the accident which situation corresponds to the fault percentage rule.

In such a manner, even when there is only one situation indicated in the fault percentage rule, the information processing device can generate various learning moving images such as moving images different between a pedestrian and a two-wheeled vehicle and moving images with different widths of a road by generating the simulated moving image by using the attribute of the party of the accident, the scene situation, and the like as components.

Specifically, the moving image generation unit 132 generates the simulated moving image by using, as a component, at least one of whether the party has been in a vehicle, an age of the party, or a type of the vehicle in which the party has been in as the attribute of the party of the accident.

In such a manner, the information processing device can generate various different learning moving images by using a vehicle type and an age (appearance) of a pedestrian as components.

Furthermore, the moving image generation unit generates the simulated moving image by using, as a component, at least one of a size, classification, and visibility of a road at the time of occurrence of the accident, priority of intersecting roads, presence or absence of a traffic light, time of occurrence of the accident, or presence or absence of an obstacle as the scene situation of the accident.

In such a manner, the information processing device can increase variations of the learning moving image in which various components assumed as the scene situation are incorporated in the simulated moving image and changed as parameters.

Furthermore, the moving image generation unit generates the simulated moving image by using, as a component, at least one of a traveling speed, acceleration, or a moving route of a party as an operation condition of the party in the accident.

In such a manner, by incorporating information related to a movement of the party into the components, the information processing device can generate the learning moving image including vehicles and the like that perform various behaviors. Thus, it is possible to increase possibility of generating a learning moving image similar to the actual accident.

Furthermore, the moving image generation unit generates the simulated moving image by using at least one of a direction or a distance of a viewpoint of when the situation at the time of occurrence of the accident is looked down as a component.

In such a manner, by using the viewpoint as the component, the information processing device can increase variations of the learning moving image in which the viewpoint is changed as the parameter.

Furthermore, the learning data generation unit generates a moving image determination model for determining which learning moving image the target moving image is similar to by using the generated learning data. The information processing device further includes the determination unit (determination unit 134 in the embodiment) that determines which percentage of fault corresponds to an accident in a target moving image by using the moving image determination model generated by the learning data generation unit.

In such a manner, the information processing device determines the percentage of fault on the basis of the similarity between the target moving image and the learning moving image, whereby it is possible to automatically and quickly determine the determination processing of the percentage of fault which processing conventionally requires manual labor.

In addition, the acquisition unit acquires, as the target moving image, the drive recorder moving image recorded by the vehicle when the accident occurs. The determination unit determines the percentage of fault in the accident corresponding to the drive recorder moving image by inputting the drive recorder moving image to the moving image determination model.

In such a manner, since the information processing device determines the percentage of fault on the basis of the similarity between the drive recorder moving image recording the actual accident situation and the learning moving image, it is possible to accurately determine the percentage of fault.

In addition, when the vehicle detects an impact, the acquisition unit acquires a moving image recorded by the vehicle before and after the impact as a drive recorder moving image.

In such a manner, under a situation in which an accident is estimated to have occurred, the information processing device automatically acquires the drive recorder moving image and determines the percentage of fault without requiring a request from a driver. As a result, the information processing device can quickly notify the user or the insurance company of the percentage of fault.

Furthermore, the determination unit calculates insurance of the accident corresponding to the drive recorder moving image on the basis of the insurance contract information of the transmission source of the drive recorder moving image and the determined percentage of fault.

In such a manner, by calculating the insurance related to the accident from the percentage of fault, the information processing device can quickly perform the insurance calculation that requires time in related art.

The server device (insurance company server 200 in the embodiment) according to the present disclosure includes the transmission unit (transmission unit 231 in the embodiment), the acquisition unit (acquisition unit 232 in the embodiment), and the calculation unit (calculation unit 233 in the embodiment). The transmission unit transmits, to the information processing device, the fault percentage rule that indicates the percentage of fault of the parties of the accident, and that is determined according to the situation at the time of occurrence of the accident. The acquisition unit acquires the percentage of fault determined in the drive recorder moving image recording the situation of when the accident actually occurs by using the moving image determination model generated on the basis of the fault percentage rule transmitted by the transmission unit. The calculation unit calculates the insurance of the accident corresponding to the drive recorder moving image on the basis of the percentage of fault acquired by the acquisition unit.

In such a manner, since the server device according to the present disclosure transmits the fault percentage rule and generates the model, the insurance can be quickly calculated by utilization of the model in a case where the accident actually occurs.

The vehicle device according to the present disclosure (vehicle 300 in the embodiment) includes the imaging unit (imaging unit 331 in the embodiment), the transmission unit (transmission unit 333 in the embodiment), and the reception unit (reception unit 334 in the embodiment). The imaging unit images an external environment viewed from the vehicle. When the vehicle detects an impact, the transmission unit transmits a moving image captured by the imaging unit before and after the impact to the information processing device as a drive recorder moving image recording the accident. The reception unit receives the percentage of fault in the accident, which percentage of fault is determined by the information processing device, on the basis of the drive recorder moving image transmitted by the transmission unit.

In such a manner, in a case where it is estimated that an accident has occurred, the vehicle device according to the present disclosure automatically transmits the drive recorder moving image and receives the percentage of fault of the accident. As a result, the vehicle device can quickly notify the user of the percentage of fault without causing the user to take any trouble.

4. Hardware Configuration

Figure 20:
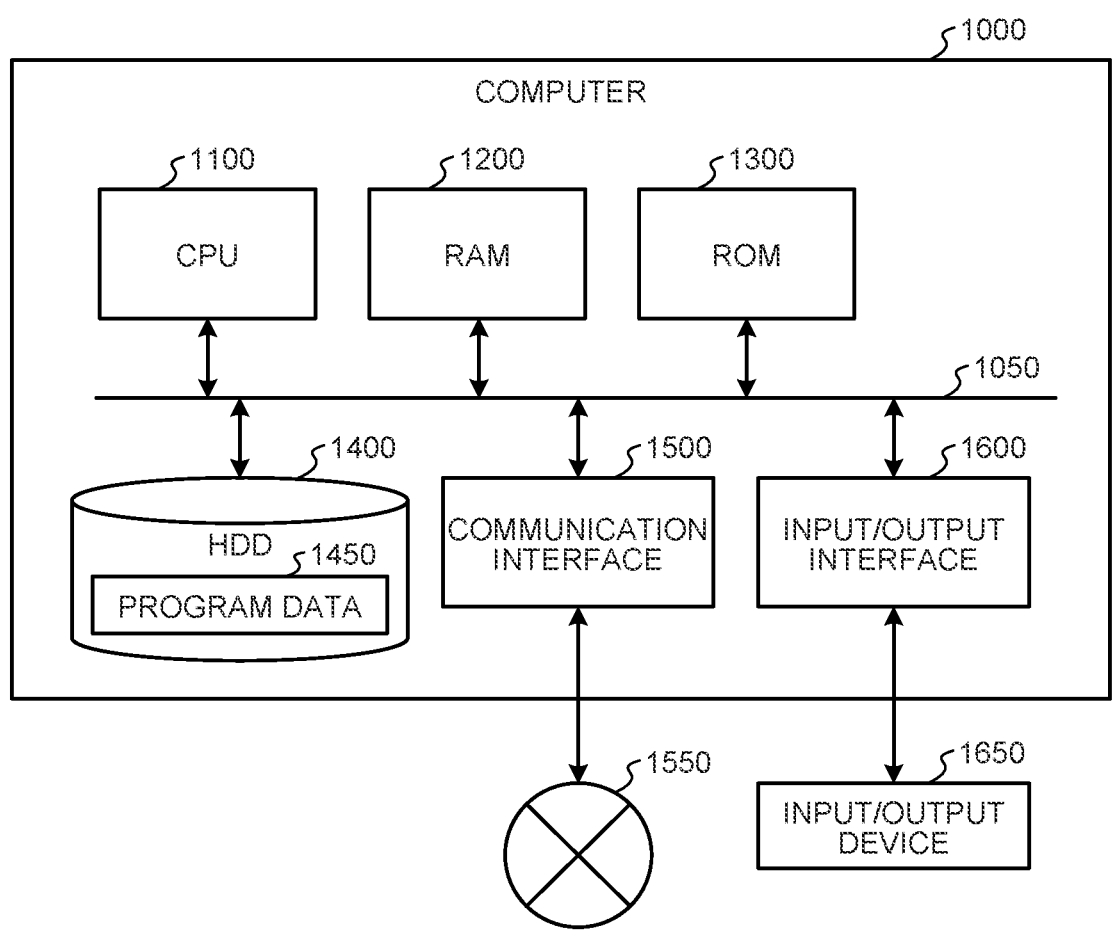
FIG. 20 is a hardware configuration diagram illustrating an example of a computer that realizes functions of the information processing device.

Information equipment such as the information processing device 100 according to each of the above-described embodiments is realized by, for example, a computer 1000 having a configuration in a manner illustrated in FIG. 20. In the following, the information processing device 100 according to the present disclosure will be described as an example. FIG. 20 is a hardware configuration diagram illustrating an example of the computer 1000 that realizes functions of the information processing device 100. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records the programs executed by the CPU 1100, data used by the programs, and the like. Specifically, the HDD 1400 is a recording medium that records an information processing program according to the present disclosure which program is an example of program data 1450.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a keyboard or mouse via the input/output interface 1600. Furthermore, the CPU 1100 transmits data to an output device such as a display, speaker, or printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 [0175] functions as the information processing device 100 according to the embodiment, the CPU 1100 of the computer 1000 realizes a function of the control unit 130 or the like by executing the information processing program loaded on the RAM 1200. Also, the HDD 1400 stores an information processing program according to the present disclosure, and data in the storage unit 120. Note that the CPU 1100 reads the program data 1450 from the HDD 1400 and performs execution thereof. However, these programs may be acquired from another device via the external network 1550 in another example.

Note that the present technology can also have the following configurations.

(1) An information processing device comprising:
an acquisition unit that acquires a fault percentage rule defined according to a situation at a time of occurrence of an accident and indicating a percentage of fault of a party of the accident;
a moving image generation unit that generates a simulated moving image assuming the situation at the time of occurrence of the accident which situation corresponds to the fault percentage rule; and
a learning data generation unit that generates learning data in which a learning moving image in which a component included in the simulated moving image is changed as a parameter is associated with the percentage of fault.

(2) The information processing device according to (1), wherein
the moving image generation unit
generates the simulated moving image by using, as the component, at least one of an attribute of the party of the accident, a scene situation of the accident, or an operation condition of the party in the accident as the situation at the time of occurrence of the accident which situation corresponds to the fault percentage rule.

(3) The information processing device according to (2), wherein the moving image generation unit generates the simulated moving image by using, as the component, at least one of whether the party has been in a vehicle, an age of the party, or a type of the vehicle in which the party has been in as the attribute of the party of the accident.

(4) The information processing device according to (2) or (3), wherein the moving image generation unit generates the simulated moving image by using, as the component, at least one of a size, classification, and visibility of a road at the time of occurrence of the accident, priority of intersecting roads, presence or absence of a traffic light, time of occurrence of the accident, or presence or absence of an obstacle as the scene situation of the accident.

(5) The information processing device according to any one of (2) to (4), wherein the moving image generation unit generates the simulated moving image by using, as the component, at least one of a traveling speed, acceleration, or a moving route of the party as the operation condition of the party in the accident.

(6) The information processing device according to any one of (1) to (5), wherein the moving image generation unit generates the simulated moving image by using at least one of a direction or a distance of a viewpoint of when the situation at the time of occurrence of the accident is looked down as a component.

(7) The information processing device according to any one of (1) to (6), wherein the learning data generation unit generates a moving image determination model that determines to which learning moving image a target moving image is similar by using the generated learning data, and further includes a determination unit that determines to which percentage of fault an accident in the target moving image corresponds by using the moving image determination model generated by the learning data generation unit.

(8) The information processing device according to (7), wherein the acquisition unit acquires, as the target moving image, a drive recorder moving image recorded by a vehicle when the accident occurs, and the determination unit determines the percentage of fault of the accident corresponding to the drive recorder moving image by inputting the drive recorder moving image to the moving image determination model.

(9) The information processing device according to (8), wherein when the vehicle detects an impact, the acquisition unit acquires a moving image recorded by the vehicle before and after the impact as the drive recorder moving image.

(10) The information processing device according to (8) or (9), wherein the determination unit calculates insurance of the accident corresponding to the drive recorder moving image on the basis of insurance contract information of a transmission source of the drive recorder moving image and the determined percentage of fault.

(11) A server device comprising:

a transmission unit that transmits a fault percentage rule defined according to a situation at a time of occurrence of an accident and indicating a percentage of fault of a party of the accident to an information processing device;

an acquisition unit that acquires the percentage of fault determined in a drive recorder moving image, which records a situation of when the accident actually occurs, by using a moving image determination model generated on a basis of the fault percentage rule transmitted by the transmission unit; and a calculation unit that calculates insurance of the accident corresponding to the drive recorder moving image on a basis of the percentage of fault acquired by the acquisition unit.

(12) A vehicle device comprising:

an imaging unit that images an external environment viewed from a vehicle;

a transmission unit that transmits, when the vehicle detects an impact, a moving image captured by the imaging unit before and after the impact to an information processing device as a drive recorder moving image recording an accident; and a reception unit that receives a percentage of fault in the accident which percentage of fault is determined by the information processing device on a basis of the drive recorder moving image transmitted by the transmission unit.

(13) An information processing method comprising:

acquiring a fault percentage rule defined according to a situation at a time of occurrence of an accident and indicating a percentage of fault of a party of the accident;

generating a simulated moving image assuming the situation at the time of occurrence of the accident which situation corresponds to the fault percentage rule; and generating learning data in which a learning moving image in which a component included in the simulated moving image is changed as a parameter is associated with the fault percentage rule, the acquiring and generating being performed by a computer.

(14) An information processing program causing a computer to function as an acquisition unit that acquires a fault percentage rule defined according to a situation at a time of occurrence of an accident and indicating a percentage of fault of a party of the accident;

a moving image generation unit that generates a simulated moving image assuming the situation at the time of occurrence of the accident which situation corresponds to the fault percentage rule; and a learning data generation unit that generates learning data in which a learning moving image in which a component included in the simulated moving image is changed as a parameter is associated with the fault percentage rule.

(15) An information processing method comprising:

transmitting a fault percentage rule defined according to a situation at a time of occurrence of an accident and indicating a percentage of fault of a party of the accident to an information processing device;

acquiring the percentage of fault determined in a drive recorder moving image, which records the situation of when the accident actually occurs, by using a moving image determination model generated on a basis of the transmitted fault percentage rule; and calculating insurance of the accident corresponding to the drive recorder moving image on a basis of the acquired percentage of fault.

(16) An information processing program causing a computer to function as a transmission unit that transmits a fault percentage rule defined according to a situation at a time of occurrence of an accident and indicating a percentage of fault of a party of the accident to an information processing device;

an acquisition unit that acquires the percentage of fault determined in a drive recorder moving image, which records the situation of when the accident actually occurs, by using a moving image determination model generated on a basis of the fault percentage rule transmitted by the transmission unit; and a calculation unit that calculates insurance of the accident corresponding to the drive recorder moving image on a basis of the percentage of fault acquired by the acquisition unit.

(17) An information processing method comprising:

imaging an external environment viewed from a vehicle;

transmitting, when the vehicle detects an impact, a moving image captured before and after the impact to an information processing device as a drive recorder moving image recording an accident; and receiving a percentage of fault in the accident which percentage of fault is determined by the information processing device on a basis of the transmitted drive recorder moving image.

(18) An information processing program causing a computer to function as an imaging unit that images an external environment viewed from a vehicle, a transmission unit that transmits, when the vehicle detects an impact, a moving image captured by the imaging unit before and after the impact to an information processing device as a drive recorder moving image recording an accident, and a reception unit that receives a percentage of fault in the accident which percentage of fault is determined by the information processing device on a basis of the drive recorder moving image transmitted by the transmission unit.

REFERENCE SIGNS LIST

1 INFORMATION PROCESSING SYSTEM
10 USER
100 INFORMATION PROCESSING DEVICE
110 COMMUNICATION UNIT
120 STORAGE UNIT
121 SIMULATED MOVING IMAGE STORAGE UNIT
122 PARAMETER STORAGE UNIT
123 MODEL STORAGE UNIT
130 CONTROL UNIT
131 ACQUISITION UNIT
132 MOVING IMAGE GENERATION UNIT
133 LEARNING DATA GENERATION UNIT
134 DETERMINATION UNIT
200 INSURANCE COMPANY SERVER
300 VEHICLE
400 MOVING IMAGE MANAGEMENT SERVER

The invention claimed is:

1. An information processing device comprising: circuitry configured to:

acquire a fault percentage rule defined according to a situation at a time of occurrence of an accident and indicating a percentage of fault of a party of the accident;

generate a simulated moving image assuming the situation at the time of occurrence of the accident which situation corresponds to the fault percentage rule;

generate learning data in which a learning moving image in which a component included in the simulated moving image is changed as a parameter is associated with the percentage of fault;

acquire, as a target moving image, a drive recorder moving image recorded by a vehicle in response to the vehicle sensing the accident occurs;

generate a moving image determination model that determines to which learning moving image the target moving image is similar by using the generated learning data;

input the target moving image into the moving image determination model to obtain a moving image vector corresponding to the target moving image;

determine, to which learning moving image the target moving image is similar by comparing the moving image vector corresponding to the target moving image with moving image vectors of the learning moving images; and determine to which percentage of fault an accident in the target moving image corresponds by using the percentage of fault associated with the determined learning moving image.

2. The information processing device according to claim 1, wherein the circuitry is further configured to generate the simulated moving image by using, as the component, at least one of an attribute of the party of the accident, a scene situation of the accident, or an operation condition of the party in the accident as the situation at the time of occurrence of the accident which situation corresponds to the fault percentage rule.

3. The information processing device according to claim 2, wherein the circuitry is further configured to generate the simulated moving image by using, as the component, at least one of whether the party has been in a vehicle, an age of the party, or a type of the vehicle in which the party has been in as the attribute of the party of the accident.

4. The information processing device according to claim 2, wherein the circuitry is further configured to generate the simulated moving image by using, as the component, at least one of a size, classification, and visibility of a road at the time of occurrence of the accident, priority of intersecting roads, presence or absence of a traffic light, time of occurrence of the accident, or presence or absence of an obstacle as the scene situation of the accident.

5. The information processing device according to claim 2, wherein the circuitry is further configured to generate the simulated moving image by using, as the component, at least one of a traveling speed, acceleration, or a moving route of the party as the operation condition of the party in the accident.

6. The information processing device according to claim 2, wherein
the circuitry is further configured to
generate the simulated moving image by using at least one of a direction or a distance of a viewpoint of when the situation at the time of occurrence of the accident is looked down as a component.

7. The information processing device according to claim 1, wherein
when the vehicle detects an impact, the circuitry is further configured to acquire a moving image recorded by the vehicle before and after the impact as the drive recorder moving image.

8. The information processing device according to claim 1, wherein
the circuitry is further configured to
calculate insurance of the accident corresponding to the drive recorder moving image on a basis of insurance contract information of a transmission source of the drive recorder moving image and the determined percentage of fault.

9. An information processing method performed by a computer, the method comprising:
acquiring a fault percentage rule defined according to a situation at a time of occurrence of an accident and indicating a percentage of fault of a party of the accident;
generating a simulated moving image assuming the situation at the time of occurrence of the accident which situation corresponds to the fault percentage rule;
generating learning data in which a learning moving image in which a component included in the simulated moving image is changed as a parameter is associated with the fault percentage rule;
acquiring, as a target moving image, a drive recorder moving image recorded by a vehicle in response to the vehicle sensing the accident occurs;
generating a moving image determination model that determines to which learning moving image the target moving image is similar by using the generated learning data;
inputting the target moving image into the moving image determination model to obtain a moving image vector corresponding to the target moving image;
determining, to which learning moving image the target moving image is similar by comparing the moving image vector corresponding to the target moving image with moving image vectors of the learning moving images; and
determining to which percentage of fault an accident in the target moving image corresponds by using the percentage of fault associated with the determined learning moving image.

10. A non-transitory computer-readable medium having embodied thereon a program, which when executed by a computer causes the computer to execute an information processing method, the method comprising:
acquiring a fault percentage rule defined according to a situation at a time of occurrence of an accident and indicating a percentage of fault of a party of the accident;
generating a simulated moving image assuming the situation at the time of occurrence of the accident which situation corresponds to the fault percentage rule;
generating learning data in which a learning moving image in which a component included in the simulated moving image is changed as a parameter is associated with the fault percentage rule;
acquiring, as a target moving image, a drive recorder moving image recorded by a vehicle in response to the vehicle sensing the accident occurs;
generating a moving image determination model that determines to which learning moving image the target moving image is similar by using the generated learning data;
inputting the target moving image into the moving image determination model to obtain a moving image vector corresponding to the target moving image;
determining, to which learning moving image the target moving image is similar by comparing the moving image vector corresponding to the target moving image with moving image vectors of the learning moving images; and
determining to which percentage of fault an accident in the target moving image corresponds by using the percentage of fault associated with the determined learning moving image.

* * * * *